(12) United States Patent
Österling et al.

(10) Patent No.: US 8,626,088 B2
(45) Date of Patent: Jan. 7, 2014

(54) DATA COMMUNICATION SCHEDULING

(75) Inventors: Jacob Österling, Järfälla (SE); Fredrol Lindgren, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 296 days.

(21) Appl. No.: 13/263,207

(22) PCT Filed: Apr. 8, 2009

(86) PCT No.: PCT/SE2009/050370
§ 371 (c)(1),
(2), (4) Date: Oct. 6, 2011

(87) PCT Pub. No.: WO2010/117313
PCT Pub. Date: Oct. 14, 2010

(65) Prior Publication Data
US 2012/0063377 A1  Mar. 15, 2012

(51) Int. Cl.
*H04B 1/04* (2006.01)
*H04W 4/00* (2009.01)
*H04M 1/00* (2006.01)
*H04B 7/08* (2006.01)

(52) U.S. Cl.
USPC ............ 455/103; 455/422.1; 455/562.1; 455/450; 455/132; 370/329

(58) Field of Classification Search
USPC ............. 370/329–330, 338–349; 455/422.1–424, 450–452.2, 500, 455/507–510, 101–103, 132–137
See application file for complete search history.

(56) References Cited

U.S. PATENT DOCUMENTS

| 6,360,106 B1 | 3/2002 | Besson |
| 6,463,050 B1 | 10/2002 | Nagashima |
| 7,983,236 B2 * | 7/2011 | Rinne et al. ............ 370/342 |
| 8,041,395 B2 * | 10/2011 | Lo et al. ............ 455/562.1 |

(Continued)

FOREIGN PATENT DOCUMENTS

| WO | 98/57516 | 12/1998 |
| WO | 02/07464 A1 | 1/2002 |
| WO | 2005/060287 A1 | 6/2005 |
| WO | 2009/115554 A1 | 9/2009 |

*Primary Examiner* — Thai Hoang
(74) *Attorney, Agent, or Firm* — Coats and Bennett PLLC

(57) ABSTRACT

A data communication scheduling system (300) of a radio base station (100) serving multiple cells (10-30) comprises multiple radio equipment, REs, (101-103) and antenna interfaces (115, 125, 135) connectable to antennas (110, 120, 130). In order to reduce the power consumption, only a subset of the RE (101) is active, while the other REs (102, 103) are turned off. A transmitter controller (155) is arranged for controlling the active RE (101) to be shared among multiple cells (10-30) during a radio frame (40) so that each cell (10-30) is guaranteed at least one sub frame (50-58) for downlink transmission. A receiver antenna system multiplexer(140) selectively interconnects the active RE (101) with the antenna interfaces (115, 125, 135) according to the operation of a receiver controller (145). Consequently, the RE (101) becomes connected to different antenna interfaces (115, 125, 135) during different sub frames (50-58) to thereby allow each cell (10-30) at least one assigned uplink sub frame (53-55) in the radio frame (40) at a predefined sub frame distance after the at least one downlink sub frame (50-52) assigned to the same cell (10-30).

24 Claims, 11 Drawing Sheets

(56) References Cited

U.S. PATENT DOCUMENTS

| | | |
|---|---|---|
| 8,340,199 B2* | 12/2012 | Nam et al. .................... 375/260 |
| 2008/0207143 A1 | 8/2008 | Skarby et al. |
| 2008/0214198 A1* | 9/2008 | Chen et al. .................... 455/450 |
| 2009/0016252 A1* | 1/2009 | Ho et al. ........................ 370/311 |
| 2009/0122736 A1* | 5/2009 | Damnjanovic et al. ....... 370/311 |
| 2010/0151908 A1* | 6/2010 | Skarby et al. ............... 455/562.1 |
| 2010/0248737 A1* | 9/2010 | Smith ........................ 455/452.2 |
| 2010/0296591 A1* | 11/2010 | Xu et al. ........................ 375/259 |

* cited by examiner

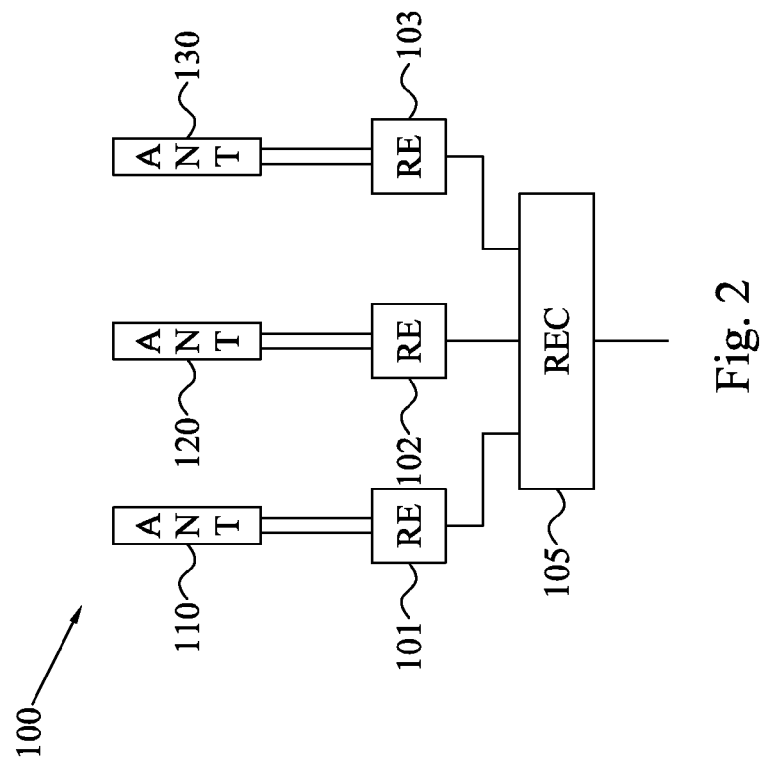
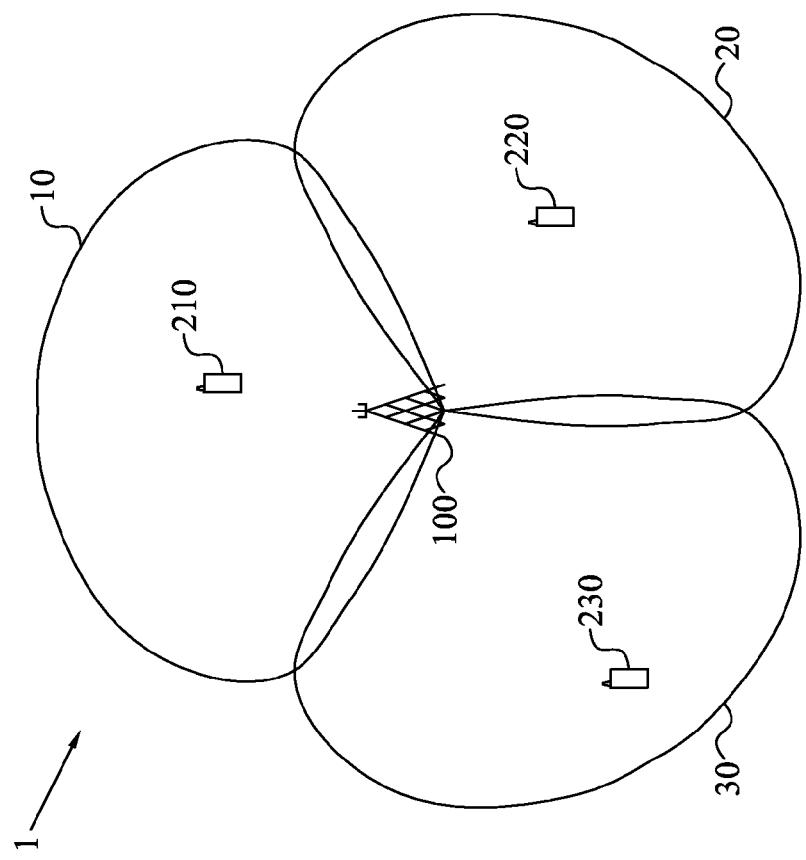
Fig. 2
Fig. 1

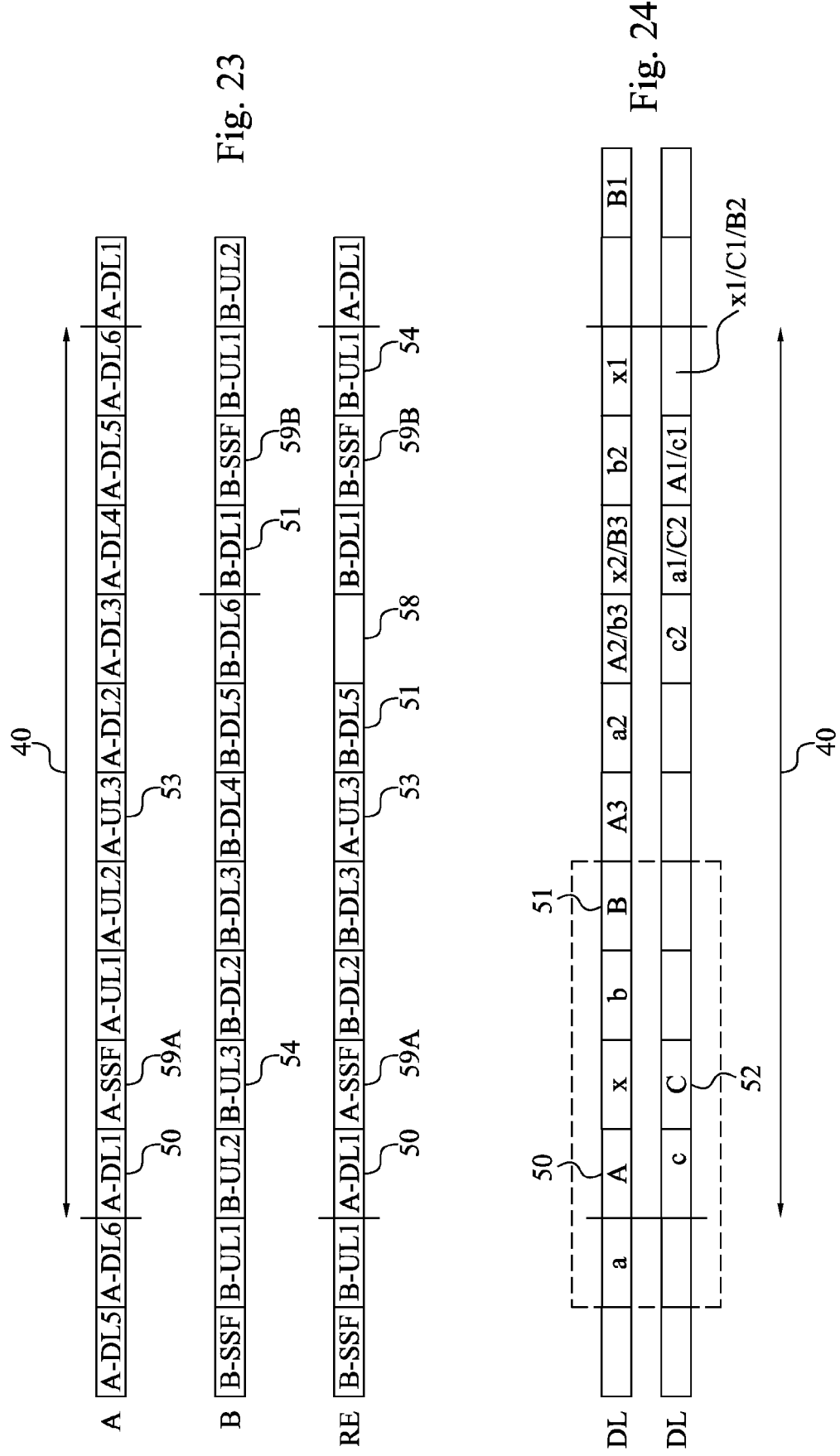

US 8,626,088 B2

DATA COMMUNICATION SCHEDULING

TECHNICAL FIELD

The present invention generally relates to radio communications technology and operations in a radio communication network, and in particular to scheduling of data communication in such a radio communication network.

BACKGROUND

In a radio communication network, such as a so-called Long Term Evolution (LTE) network, there are one or more network nodes, so called radio base stations, arranged for controlling and scheduling data traffic to and from user equipment present within a geographical area or areas, denoted cell(s), served by the radio base station.

The radio base station consequently comprises, for each such cell, equipment in the form of one or more receivers and transmitters, or transceivers, employed for effecting the wireless data communication. These receivers and transmitters consume a significant amount of energy even when currently not transmitting or receiving any data. This energy required to keep the equipment on is denoted static energy consumption to distinguish it from the dynamic energy consumption relating to the energy needed for actually transmitting and receiving data over the air interface.

The main focus in terms of reducing energy consumption in the art has been directed towards decreasing the dynamic energy consumption, mainly by improving the efficiency of the power amplifiers in the receivers and transmitters of the radio base station. However, during a large portion of the operation time of the radio base stations, the traffic load and demands of the radio base stations are not that high, implying that the static energy consumption becomes a major part of the total energy consumption of the radio base stations.

WO2009/041871 discloses a technique for energy reduction in an LTE network. This technique involves performing measurements of system load in a cell. Based on these measurements, a decision is made to vary the number of available downlink sub frames, which are used by a radio base station for the transmission of data to user equipment in the cell. This will reduce the dynamic energy consumption as some of the sub frames will be declared idle and the transmitters can consequently be in stand-by mode during these idle sub frames.

SUMMARY

The above identified application WO2009/041871 contributes to saving energy by radio base stations in the radio communication network. There is, however, still a need for further reducing the energy consumption, in particular reducing the static energy consumption of the radio base stations.

It is a general objective to provide a data communication scheduling in a radio base station.

It is a particular objective to provide such a data communication scheduling allowing reduction of static power consumption by the radio base station.

These and other objectives are met by embodiments as defined by the accompanying patent claims.

The present invention relates to a data communication scheduling system adapted for arrangement in a radio base station serving multiple cells in a radio communication network. The data communication scheduling system comprises at least one transmitter and at least one receiver per cell. Each cell further has its dedicated antenna interface connectable to a respective antenna arrangement of the radio base station and used for transmitting data from its connected transmitter/transmitters and forwarding captured data to its connected receiver/receivers.

In order to reduce the power consumption of the radio base station and in particular the static power consumption, only a subset of the transmitters and receivers are active in the data communication scheduling system, while remaining transmitters and receivers are at least temporarily turned off.

A transmitter controller is arranged in the data communication scheduling system in order to effectuate efficient downlink transmission to user equipment present in the served cells using the reduced number of active transmitters. The transmitter controller controls at least one active transmitter to be shared between multiple cells during different sub frames of a radio frame. This means that the at least one transmitter is employed for transmission of data destined for user equipment in a first of the cells during at least one sub frame in the radio frame. The same at least one transmitter is then employed for transmission of data destined for user equipment in a second cell during at least one other sub frame in the radio frame.

Furthermore, the transmitter controller controls the operation of the transmission branch in the data communication scheduling system so that each served cell is assigned at least one sub frame of the radio frame for downlink transmissions for each respective cell.

A receiver antenna system multiplexer selectively interconnects the active receivers and the antenna interfaces to forward received data from an antenna interface to one of the active receivers. The operation of the receiver antenna system multiplexer is controlled by a receiver controller so that at least one of the active receivers is shared between multiple cells. This means that the at least one receiver is employed for reception of data from user equipment in a first of the cells during at least one sub frame in the radio frame. The same at least one receiver is then employed for reception of data from user equipment in a second cell during at least one other sub frame in the radio frame.

Furthermore, the receiver controller controls the receiver antenna system multiplexer to selectively interconnect the receivers and antenna interfaces so that each antenna interface dedicated for a respective cell is connected to an active receiver during at least one sub frame assigned for reception of uplink data in the cell. This at least one sub frame is furthermore scheduled to follow the at least one downlink sub frame assigned to the same cell by a predefined sub frame distance.

A radio base station comprising the data communication scheduling system and multiple antenna arrangements connected to the antenna interfaces of the data communication scheduling system is also disclosed.

A method for scheduling data communication involves scheduling data transmission by a radio base station for the multiple served cells using merely a subset of the transmitters arranged in the radio base station. The scheduling is performed so that at least one active transmitter is shared between multiple cells and consequently is used for transmitting data destined to a first cell during at least one sub frame in a radio frame and transmitting data destined to a second cell during at least one other sub frame in the radio frame.

Active receivers are selectively connected to the antenna arrangements of the radio base station so that at least one active receiver is connected to a first antenna arrangement during at least one sub frame of the radio frame and to a second antenna arrangement during at least one other sub frame of the radio frame. This selective connection is further conducted so that each antenna arrangement of the respective cells is connected to an active receiver during at least one sub frame assigned for reception of data for the respective cell and being present, at a predefined sub frame distance, after the at least one downlink sub frame scheduled for the respective cell.

The embodiments allow a reduction in the static power consumption of the radio base station. Furthermore, also the total power consumption of the radio base station is reduced at low and moderate traffic load situations but with maintained capacity and quality of service.

BRIEF DESCRIPTION OF THE DRAWINGS

The embodiments, together with further objectives and advantages thereof, may best be understood by making reference to the following description taken together with the accompanying drawings, in which:

FIG. 1 is a schematic overview of a radio communication system according to an embodiment;

FIG. 2 illustrates a portion of a radio base station according to prior art techniques;

FIG. 23 illustrates an embodiment of a radio frame with scheduled transmission and reception for a time division duplex mode; and FIG. 24 illustrates an embodiment of a radio frame with scheduled downlink transmission using Hybrid Automatic Repeat ReQuest.

DETAILED DESCRIPTION

Figure 3:
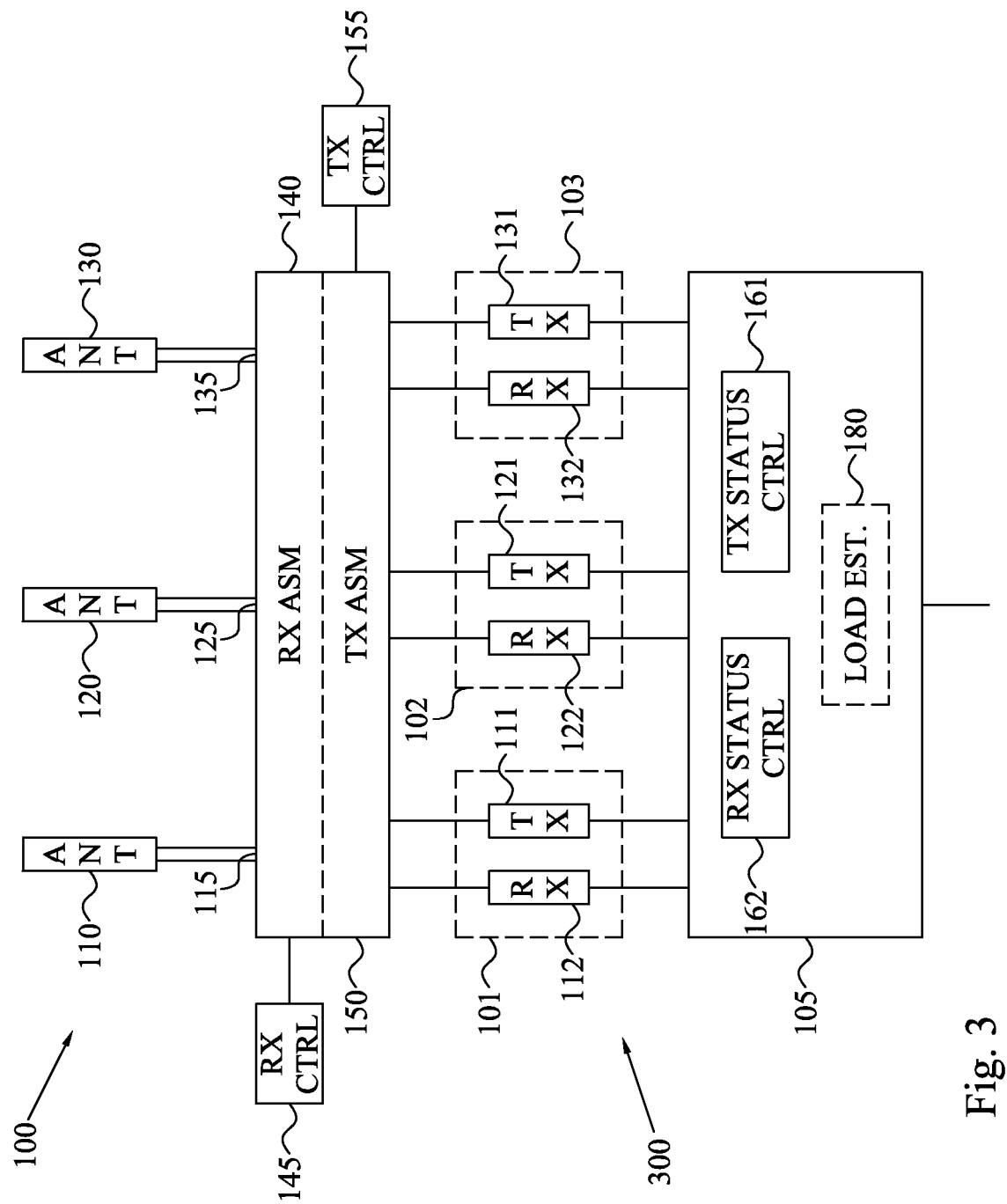
FIG. 3 illustrates a portion of a radio base station according to an embodiment.

Throughout the drawings, the same reference numbers are used for similar or corresponding elements.

Embodiments as disclosed herein relate to data communication scheduling by a radio base station in a radio communication network and in particular using such data communication scheduling to enable a reduction in the static power consumption of the radio base station.

The data communication scheduling and the static power consumption that it enables are implementable in a radio base station serving multiple cells or sectors in the radio communication network. Thus, the radio base station comprises equipment for providing communication services to user equipment present in different geographical areas or cells served by the single radio base station. FIG. 1 is an overview of a part of a radio communication network 1 comprising such a radio base station 100. In the figure, the radio base station 100 has been exemplified as a radio base station serving three cells 10, 20, 30 and any user equipment 210, 220, 230 present in the respective geographical areas of the cells 10, 20, 30. However, a three-sectorized cell arrangement as in FIG. 1 should merely be seen as an illustrative embodiment and the invention is not limited thereto. Furthermore, the geographical areas of the multiple cells 10, 20, 30 served by the radio base station 100 do not necessarily together have to cover the full 360° area around the radio base station 100. In such a case, the combined coverage area of the multiple cells 10, 20, 30 instead merely amounts to a portion of the full 360° area.

The expression "radio base station" as used herein also encompasses the more recent entities, such as NodeB and evolved NodeB (eNodeB), which are capable of handling more than one cell, and other corresponding network nodes, such as base transceiver station (BTS) and base station (BS).

Similarly, "user equipment" will be used to indicate different types of radio terminals, such as a mobile station, mobile user equipment, a laptop, etc. having functionality for wirelessly communicating with radio base stations in the radio communication network.

FIG. 2 is a schematic illustration of a portion of the transmission and reception equipment in a radio base station 100. The radio base station 100 comprises a radio equipment controller (REC) 105 arranged for handling the base band signal processing and the medium access control (MAC) scheduler. The REC 105 is connected to the radio equipment (RE) 101, 102, 103 comprising the actual radio receivers and radio transmitters for the cells. In a typical implementation, as illustrated in FIG. 2, a radio base station 100 has one RE 101, 102, 103 per served cell, although the RE 101, 102, 103 may comprise one or more receivers and transmitters dedicated for reception of data from user equipment and transmission of data to user equipment present in the area of the cell, respectively.

In the following, the expressions "receiver" and "transmitter" are used for denoting the equipment in the RE 101, 102, 103 employed for receiving data by means of a connected antenna arrangement 110, 120, 130 and transmitting data by means of a connected antenna arrangement 110, 120, 130. The receiver and transmitter also comprise functionality known in the art for processing the received and transmitted data, such as power amplifiers, etc. In the art, the expression "transceiver" is sometimes employed for denoting the combined functionality of a receiver and transmitter. The expressions "receiver" and "transmitter" therefore also encompass the receiving branch and the transmitting branch of such a transceiver, respectively.

Embodiments relates to a data communication scheduling system that is adapted for arrangement in a radio base station serving at least $M \geq 2$ cells. The data communication scheduling system is configured for sharing transmitter/transmitters and receiver/receivers between the cells in order to reduce the static power consumption of the data communication scheduling system and the radio base station, in which it is implemented. However, note that even though the data communication scheduling and static power consumption reduction of the embodiments is applied to M cells of the radio base station, one or more further cells must not necessarily be involved in the data communication scheduling but instead utilize its/their dedicated transmitter/transmitters and receiver/receivers without any sharing to or by other cells served by the radio base station.

The radio base station also comprises at least M antenna arrangements or systems arranged for performing the actual transmission and reception of data. In a particular embodiment, the radio base station comprises one such antenna arrangement per cell but may optionally comprise at least one additional antenna arrangement as is further described herein. An antenna arrangement can comprise a single combined reception and transmission antenna, a dedicated reception antenna and a dedicated transmission antenna or multiple dedicated or combined reception and transmission antenna for the purpose of achieving antenna diversity and transmit diversity and/or reception diversity.

In operation, these M antenna arrangements are connected to the data communication scheduling system through respective antenna interfaces. As a consequence, the data communication scheduling system comprises at least M antenna interfaces, where the actual value of M is dictated by the number of antenna arrangements in the radio base station, in which the data communication scheduling system is arranged or is to be arranged.

According to the embodiments, the data communication scheduling system also comprises $M_{TX}$ transmitters and $M_{RX}$ receivers, where $M_{TX} \geq M$ and $M_{RX} \geq M$. In a particular embodiment $M_{TX} \geq M_{RX}$. These transmitters and receivers are distributed among the cells so that each cell of the M cells is assigned at least one transmitter and at least one receiver. For instance, each cell can comprise one or two transmitters and one or two receivers in its RE. Furthermore, each cell has an assigned antenna arrangement connected to its RE with the at least one assigned receiver and transmitter. In a preferred embodiment, the number of transmitters assigned to a cell and present in its RE is equal to the number of receivers assigned to the cell. The embodiments are, though, not limited to that preferred implementation but can have different number of assigned transmitters as compared to assigned receivers for the cells. Note also that even though the M cells all preferably have the same number of assigned transmitters and receivers, the embodiments are not limited thereto.

The $M_{TX}$ transmitters and $M_{RX}$ receivers of the data communication scheduling system are connectable to at least one antenna interface of the M antenna interfaces. In operation, the antenna interfaces are connected to respective antenna arrangements in order to direct received data from an antenna arrangement, via an antenna interface, to a correct receiver and forward data from a transmitter to an intended antenna arrangement as will be described further herein.

In the following, the embodiments will be described further in connection with a Long Term Evolution (LTE) radio communication network. In LTE, a time-domain structure is employed for effecting data communication. A radio frame or frame is of length 10 ms and consists of 10 sub frames of length 1 ms each.

According to the embodiments, the radio frame structure of LTE is employed in an inventive way to allow a temporary shutting off of radio equipment, i.e. transmitters and receivers of a data communication scheduling system, and instead sharing radio equipment between cells. Thus, the embodiments allow saving static power consumption of the data communication scheduling system and of a radio base station, in which the data communication scheduling system is arranged, by merely utilizing a subset of the available transmitters and receivers for scheduling the data communication in the served cells. The remaining transmitters and receivers can consequently be turned off to reduce the power consumption. Turning off a transmitter or receiver preferably involves temporarily shutting off the power to all the equipment and functionality housed within the transmitter or receiver. Alternatively, a subset of this equipment and functionality can be powered down, in particular the power-consuming power amplifiers and the optional cooling fans arranged in connection with the power amplifiers. From operation point of view, it is immaterial whether the full transmitter/receiver is turned off or only some of its including equipment/functionality as the transmitter/receiver is anyhow inoperable during the turned off period.

The embodiments are in particular directed towards providing a data communication scheduling in the radio base station that enables turning off transmitters and receivers but still serves the data traffic in the cells. The data communication scheduling can, however, also be used in connection with unintentional stops in the operation of transmitters and receivers due to malfunctions. In both cases the traffic in the different cells are handled by merely a subset of the transmitters and receivers and subject to the particular data communication scheduling.

According to the embodiments, a transmitter controller of the data communication scheduling system is arranged for scheduling transmission by the radio base station for the M cells during a radio frame using merely $N_{TX}$ transmitters, where $1 \geq N_{TX} < M_{TX}$. This means that the remaining $M_{TX} - N_{TX}$ transmitters of the data communication scheduling system are intentionally turned off to save power or unintentionally shut down due to malfunctions. The scheduling controlled by the transmitter controller is conducted so that at least one transmitter of the $N_{TX}$ transmitters is arranged for transmission of data destined for user equipment in a first cell of the M cells during at least one sub frame in the radio frame. Correspondingly, the same at least one transmitter is switched for transmission of data destined for any user equipment in a second cell of the M cells during at least one other sub frame in the radio frame. In other words, at least two of the cells associated with the radio base station are served by the same at least one transmitter during a radio frame. The at least one transmitter is therefore switched between transmission of data destined for a first cell and data destined for a second cell during a single radio frame.

Furthermore, the transmitter controller controls the scheduling of data transmission so that each cell of the M cells is assigned at least one sub frame in the radio frame for transmission of data destined for user equipment in the respective cell. The scheduling consequently guarantees that even though only a subset, i.e. $N_{TX}$ of the transmitters are available, each cell is guaranteed at least one sub frame for communication of data intended for any user equipment present in the geographical area of the particular cell.

This at least one sub frame therefore preferably carries the system information required by user equipment in order to access the LTE network. Such information includes information needed in order to compile and transmit a random access to the radio base station. In LTE, the information includes information of the frequency at which the random access should be transmitted and at least one random access preamble applicable in the cell. The system information is generally carried by the Physical Broadcast Channel (PBCH). Correspondingly, information allowing user equipment to synchronize to the radio frame structure of a cell is traditionally carried by the Primary Synchronization Signal (PSS) and the Secondary Synchronization Signal (SSS). Thus, the PBCH, PSS and SSS comprise the information needed by user equipment in order to compile and transmit a random access to the radio base station to thereby become connected to the radio communication network. These channels are consequently included in the one or more of the respective at least one sub frame guaranteed to be assigned to each cell of the radio base station by the transmitter controller. Any other downlink data intended for one or more user equipment in the cell is also transmitted in the at least one sub frame dedicated to the cell.

The transmitter controller, thus, performs a downlink scheduling using the limited number $N_{TX}$ of available transmitters for effectuating the necessary control signaling in addition to upholding sufficient downlink traffic transmissions for the user equipment.

The data communication scheduling system also comprises a so-called receiver antenna system multiplexer connected to at least $N_{RX}$ receivers among the $M_{RX}$ receivers and the M antenna interfaces assigned to the M cells. More preferably, the receiver antenna system multiplexer is connected to all $M_{RX}$ receivers in the data communication scheduling system. This receiver antenna system multiplexer is arranged for selectively connecting a receiver of the $N_{RX}$ receivers to an antenna interface of the M antenna interfaces. In similarity to the transmitters discussed above, only a subset of the $M_{RX}$ receivers is indeed available for the radio base station during at least a portion of time as $1 \geq N_{RX} < M_{RX}$. The remaining $M_{RX}$-$N_{RX}$ receivers are fully or at least partly shut down. The receiver antenna system multiplexer is further connected to and controlled by a receiver controller. This receiver controller causes the receiver antenna system multiplexer to selectively interconnect the $N_{RX}$ available receivers and the M antenna interfaces so that at least one receiver of the $N_{RX}$ receivers is connected to a first antenna interface assigned to a first cell during at least one sub frame of the radio frame. This at least one receiver is then connected to a second antenna interface assigned to a second, different cell during at least one other sub frame of the radio frame. In other words, at least one of the available $N_{RX}$ receivers is shared between at least two, possibly all M cells served, in operation, by the radio base station. This means that the receiver controller controls the receiver antenna multiplexer to switch the at least one receiver to receive data during at least a first sub frame from the first antenna interface and then receive data during at least a second sub frame from a different antenna interface.

In addition, the receiver controller controls the receiver antenna system multiplexer to selectively interconnect receivers and antenna interfaces so that each cell has its antenna interface connected to a receiver of the $N_{RX}$ receivers during at least one sub frame. This at least one sub frame is assigned for reception of uplink data from user equipment in the respective cell. In addition, the sub frame is present at a predefined sub frame distance from the at least one sub frame assigned to the respective cell by the transmitter controller.

This latter requisite is necessary in order to achieve correct data communication in a LTE communication network as a correct downlink transmission in a cell will be responded by a receiving user equipment by an acknowledgement a predefined sub frame distance later on the uplink. In more detail, LTE employs a Hybrid Automatic Repeat ReQuest (HARQ) protocol in the MAC layer. This HARQ protocol is mainly employed to correct block errors that occur over the air interface. HARQ processes are used to associate a potential retransmission to its original transmission in order to enable soft combining at the HARQ receiver. Only when the HARQ receiver has reported correct reception of the data sent on a HARQ process may it be used to transmit new data. Consequently, before the reception of a HARQ status report or acknowledgement from the user equipment, the radio base station cannot know if it should send new data or a retransmission of the "old data".

Therefore, a downlink sub frame in a cell is consequently scheduled to have an associated uplink sub frame allowing reception of any acknowledgements/not acknowledgements (ACK/NACK) from user equipment in the cell. This uplink sub frame is today scheduled four sub frames after the downlink sub frame.

It should, though, be noted that the exact structure of the radio frame and the mapping of control and data channels onto the radio frames and any ACK/NACK scheduling is an ongoing process in 3GPP. Hence, the description provided herein is used merely as an example in order to illustrate possible implementations of the embodiments and it should be understood that variations may occur, with the embodiments being equally applicable to radio communication networks having other radio frame structures, channel mappings and/or ACK/NACK scheduling.

The invention will now be further described with reference to particular embodiments illustrating the implementation of the technical features. FIG. 3 is a schematic illustration of the data communication portion of a radio base station 100 and a data communication scheduling system 300 according to an embodiment. In this illustrative example, the radio base station serves M=3 cells and consequently has three antenna arrangements 110, 120, 130, each dedicated for data transmission and reception in a respective cell. Three REs 101, 102, 103 are connected to the antenna arrangements 110, 120, 130 through a receiver antenna system multiplexer (RX ASM) 140 and a corresponding transmitter antenna system multiplexer (TX ASM) 150 and through respective antenna interfaces 115, 125, 135. The multiplexers 140, 150 are controlled by a receiver controller (RX ctrl) 145 and a transmitter controller (TX ctrl) 155.

In the illustrative example, each RE 101, 102, 103 comprises a receiver (RX) 112, 122, 132 and a transmitter (TX) 111, 121, 131, thus $M_{RX}$=$M_{TX}$=3.

In a typical implementation, at least one of the receivers 112, 122, 132 and at least one of the transmitters 111, 121, 131 is turned off by a receiver status controller (RX status ctrl) 162 and a transmitter status controller (TX status ctrl) 161, respectively. In a first embodiment, the receiver status controller 162 turns off the power of one of the receivers 132 and the transmitter status controller 161 likewise turns off the power of one of the transmitters 131, preferably arranged in the same RE 103 as the turned off receiver 132. In a second embodiment, two receivers 122, 132 and two transmitters 121, 131 are turned off by the receiver and transmitter status controllers 161, 162.

The operation of the receiver and transmitter status controllers 161, 162 is preferably based at least partly on expected traffic load in the three cells. Thus, if the expected traffic load is at low or moderate levels one or two of the three available receiver-transmitter pairs 121, 131, 122, 132 may indeed be turned off and the remaining receiver-transmitter pair/pairs 111, 112 will be enough to handle the uplink and downlink traffic in the three cells.

Statistical information based on measurements during different portions of a day, week and/or a month can be collected by the network operator and used as a basis for determining intervals of a day, week and/or month, during which the traffic load is expected to be low enough to allow turning off receiver-transmitter pair/pairs. In particular, during night time the expected number of user equipment present in the areas of the three cells and requiring communication resources from the radio base station could on average be low enough that the receiver and transmitter status controllers 161, 162 are pre-configured to turn off the power of the selected at least one transmitter 121, 131 and receiver 122, 132 during the night.

Alternatively, an optional load estimator 180 can be arranged in the data communication scheduling system 300, preferably in the REC 105. This load estimator 180 estimates the amount of currently buffered data to and from the user equipment in the cells to thereby get an estimate of the traffic status in the cells. If the total amount of data traffic is estimated to be below a traffic threshold, the load estimator 180 signals the receiver and transmitter status controllers 161, 162 to turn off the power of a subset of the transmitters 121, 131 and the receivers 122, 132. The load estimator 180 may optionally have access to multiple different traffic thresholds. In such a case, the receiver and transmitter status controller 161, 162 can turn off the power of a first transmitter 131 and receiver 132 if the estimated traffic load is below a first traffic threshold but exceeds a second traffic threshold. First when the estimated traffic load is below the second traffic threshold will the receiver and transmitter status controllers 161, 162 turn off the power of also the second transmitter 121 and receiver 122, 132.

In the embodiment illustrated in FIG. 3, the receiver and transmitter status controllers 161, 162 are both implemented in the REC 105 of the data communication scheduling system 300.

In the following discussion in connection to FIG. 3, it is non-limitedly assumed that the receiver and transmitter status controllers 161, 162 turn off the power of two of the three receivers 112, 122, 132 and transmitters 111, 121, 131, i.e. $N_{RX}=N_{TX}=1$.

As was mentioned in the foregoing, the receiver antenna system multiplexer 140 connects the three receivers 112, 122, 132 with the three antenna interfaces 115, 125, 135 and, when being arranged in the radio base station 100, therefore with the three antenna arrangements 110, 120, 130. Consequently, data captured by the antenna arrangements 110, 120, 130 are forwarded via the antenna interfaces 115, 125, 135 to the correct receiver 112, 122, 132 by the receiver antenna system multiplexer 140. The receiver antenna system multiplexer 140 in particular selectively connects the single active receiver 112 to the different antenna interfaces 115, 125, 135 during different sub frames as controlled by the receiver controller 145.

Correspondingly, the transmitter antenna system multiplexer 150 selectively connects the three transmitters 111, 121, 131 with the three antenna interfaces 115, 125, 135 and, when being arranged in the radio base station 100, therefore with the three antenna arrangements 110, 120, 130. Thus, data from the transmitters 111, 121, 131 is forwarded by the transmitter antenna system multiplexer 150 through the antenna interfaces 115, 125, 135 to the correct antenna arrangement 110, 120, 130. The transmitter antenna system multiplexer 150 in particular selectively connects the single active transmitter 111 to the different antenna interfaces 115, 125, 135 during different sub frames as controlled by the transmitter controller 155.

The transmitter controller 155 consequently controls the transmitter antenna system multiplexer 150 to selectively connect the transmitter 111 to the antenna interfaces 115, 125, 135 so that the respective antenna interface 115, 125, 135 of each of the three cells is connected to the transmitter 111 during at least one sub frame of a radio frame. This means that the transmitter antenna system multiplexer 150 will switch between forwarding data from the transmitter 111 to the first antenna interface 115, the second antenna interface 125 and the third antenna interface 135. Furthermore, during the radio frame the transmitter 111 is dedicated for processing and forwarding data to each of the three antenna interfaces 115, 125, 135 but in different sub frames.

Correspondingly, the receiver controller 145 controls the receiver antenna system multiplexer 140 to selectively connect the receiver 112 to the three antenna interfaces 115, 125, 135 so that the respective antenna interfaces 115, 125, 135 of each of the three cells is connected to the receiver 112 during at least one sub frame of the radio frame. Furthermore, the sub frame during which the receiver 112 is connected to the antenna interface 115 of a given cell is present at the predefined sub frame distance from the sub frame during which the transmitter 114 is connected to the same antenna interface 115.

Figure 14:
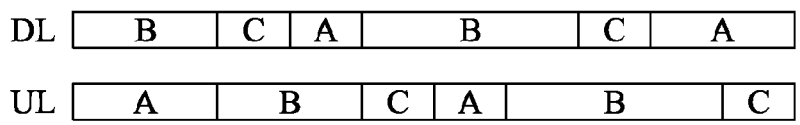
FIG. 14 schematically illustrates time multiplexing downlink and uplink according to an embodiment.

FIG. 14 schematically illustrates a radio frame for the uplink (UL) and the downlink (DL) and the assignment of sub frames to the three different cells denoted A, B and C in the figure. In the figure, the uplink is indicated as one stream. LTE normally uses receiver diversity in the uplink. However, the figure merely indicates a single stream in order to simplify the understanding of the embodiments. The operations of the receiver and antenna system multiplexers 140, 150 will cause the transmitter 111 and the receiver 112 to be time multiplexed between the three cells.

Figure 15:
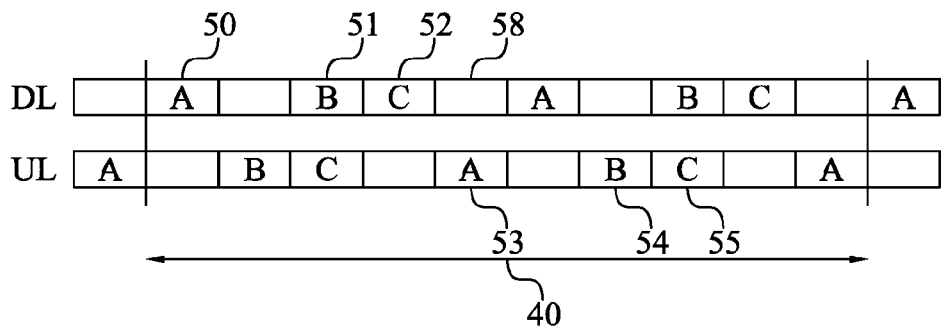
FIG. 15 illustrates an embodiment of a radio frame with scheduled transmission and reception with time multiplexing downlink and uplink.

FIG. 15 is an example of radio frame structure with time multiplexed uplink and down link transmission for one active RE 101 and three served cells. In this embodiment, the transmitter 111 sends to each of the cells A, B, C in a respective sub frame 50, 51, 52 that recurs every 5 ms. As a consequence, each cell is assigned at least two sub frames 50, 51, 52 for downlink transmission during a radio frame 40 and these correspond to sub frames 0 and 5 in each cell. This is preferred distribution of sub frames as today in LTE, PBCH, PSS and SSS appear in sub frames 0 and 5 in each radio frame 40 for a cell. As a consequence, the same distribution of control signals within a radio frame 40 as the LTE standard can thereby be achieved.

Note that the sub frame indicated with reference number 50 in the figure corresponds to sub frame 0 for the first cell A. Correspondingly, the sub frame indicated by 51 is interpreted as sub frame 0 for the second cell B and so on.

The remaining four sub frames 58 in the radio frame 40 can be used arbitrary in the cells and preferably depending on the traffic demand in each cell. However, in order to allow ACK/NACK of downlink traffic, a downlink sub frame 50, 51, 52 assigned for a cell should be accompanied with an uplink sub frame 53, 54, 55 assigned to the same cell four sub frames later.

As is illustrated in the figure, the downlink sub frames 50, 51, 52 assigned to the different cells have corresponding uplink sub frames 53, 54, 55 present four sub frames later. One of these uplink sub frames 53, 54, 55 can be used for random access (RACH, Random Access Channel) reception in the cell.

In order to also decrease the dynamic power consumption of the radio base station 100, as few of the four remaining sub frames 58 are used possible. Thus, in a minimum load scenario, only six of the ten sub frames in a radio frame 40 are used for communicating data. As the traffic load increases in one or more of the cells, these extra sub frames 58 can be used to serve that traffic.

In order to improve the channel estimation for user equipment, extra sub frames can be assigned for the cell in the sub frame before the sub frame 50, 51, 52 carrying the synchronization channels. In such a case, the user equipment has access to two consecutive downlink sub frames to better detect the synchronization channels by averaging the channel estimate. With a single transmitter available and switched between the three different cells, this cannot be accomplished for all the cells. If the radio base stations in the radio communication network are time synchronized to each other, which is common in LTE, the synchronization channels will have a ⅓ reuse, thus reducing the interference and, improving the ability for user equipment to estimate the synchronization channels. As consequence, it is generally not necessary to have two consecutive downlink sub frames per cell.

In an embodiment, the REC 105 will primarily schedule the traffic in each cell on the same sub frame 50, 51, 52 as is transmitting the synchronization channel for that cell. This gives 10% of the maximum capacity in the cell and >20% of the average capacity, or even more if the radio base stations are synchronized with ⅓ reuse. If the traffic load is higher extra sub frames 58 can be assigned to the cells. When the traffic load is higher than can be served by one transmitter 111, the transmitter status controller 161 switches on one of the turned off transmitters 121.

The receiver and antenna system multiplexers 140, 150 should be able to operate on micro second level, thus between sub frames, in order correctly forward data between the active receiver 162 or transmitter 161 and the correct antenna arrangement 110, 120, 130.

Figure 4:
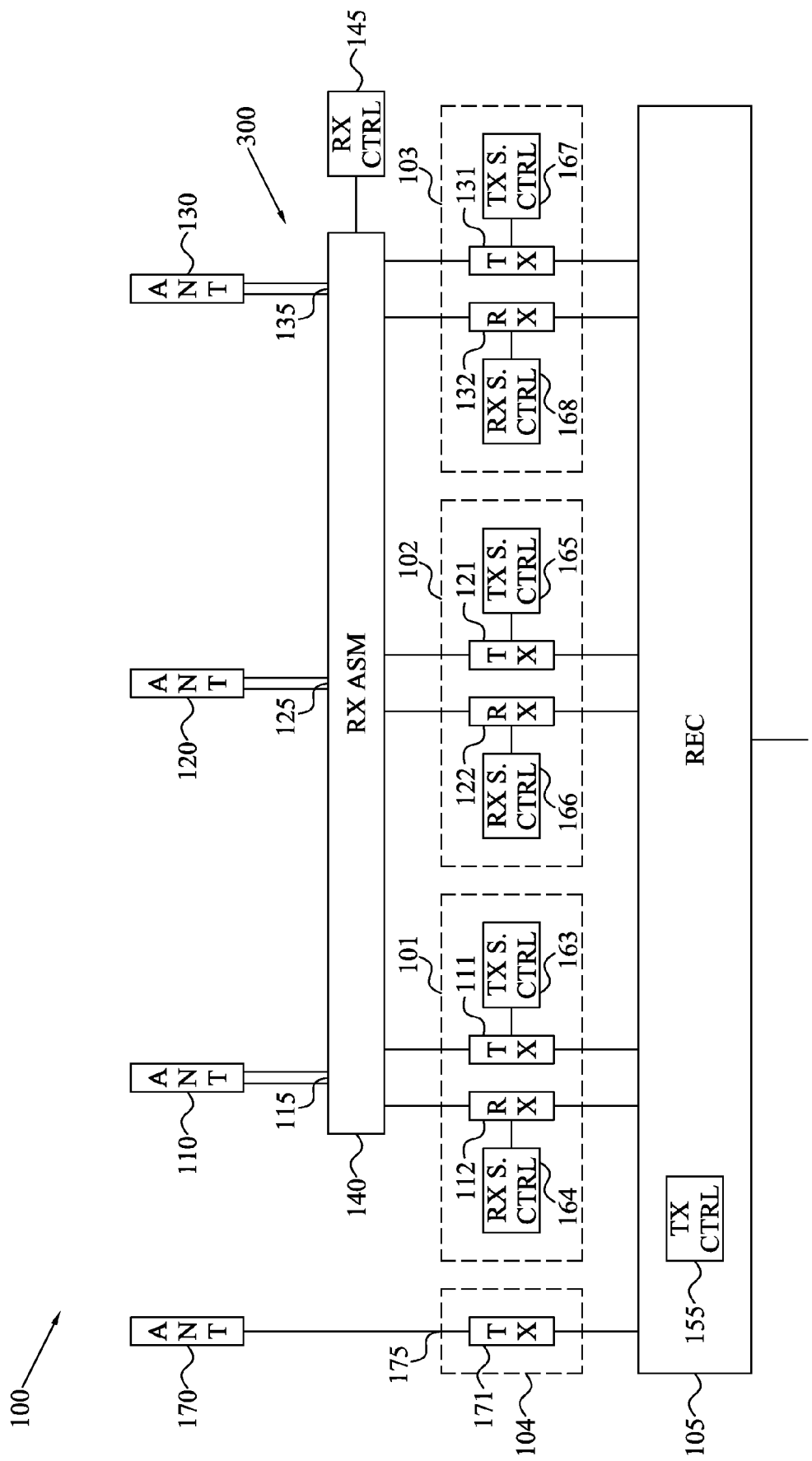
FIG. 4 illustrates a portion of a radio base station according to another embodiment.

FIG. 4 is an illustration of the communicating portion of a radio base station 100 and a data communication scheduling system 300 according to another embodiment. In contrast to the embodiment of FIG. 3, this data communication scheduling system 300 does not comprise any transmitter antenna system multiplexer. Thus, no selective forwarding of data between a single active transmitter and the three antenna interfaces 115, 125, 135 is conducted in this embodiment.

The data communication scheduling system 300 instead comprises a so-called multi-cell RE 104 that is primarily used during low load scenarios. The multi-cell RE 104 has $N_{TX}$ transmitters 171, one transmitter 171 in the figure. The multi-sector RE can have the same requirements on linearity as the normal REs 101, 102, 103 and, thus, be able to transmit traffic at the same characteristics. Alternatively, it is simplified to only be able to transmit lower power and/or low linearity. It would then be able to handle less capacity than the normal REs 101, 102, 103.

The multi-cell RE 104 preferably has its dedicated antenna interface 175 connectable to a dedicated antenna arrangement 170 in order to remove the need for a transmitter antenna system multiplexer. In a preferred implementation, this antenna arrangement 170 is a so-called omnidirectional antenna arrangement 170 capable of radiating power in all the cells served by the radio base station 100. If the combined radio coverage area of the served cells does not cover the full 360° area around the radio base station 100, the antenna arrangement 170 must not necessarily by an omnidirectional antenna but should, however, be able to transmit in the areas of the multiple cells.

The transmitter controller 155 of the data communication scheduling system 300 has been illustrated implemented in the REC 105 in the figure. This should merely be seen as an illustrative example. The transmitter controller 155 could alternatively be arranged in the multi-cell RE 104 or be connected to the REC 105 or the multi-cell RE 104.

In this embodiment, the $N_{TX}=1$ transmitter 171 is controlled by the transmitter controller 155 for broadcasting data destined for user equipment in the M=3 cells using the (omnidirectional) antenna arrangement 170 at the sub frames of the radio frame assigned for transmission of data to the cells. Thus, during each downlink sub frame when the transmitter 171 sends data via the antenna interface 175 and the antenna arrangement 170, the same data is broadcast in all the cells. However, the content of the data will typically only be relevant for user equipment present in one of the cells. Thus, the transmitter controller 155 controls the transmitter 171 to broadcast data relevant for a first cell in all cells during a first sub frame in the radio frame. Correspondingly, the transmitter 171 is controlled to broadcast data relevant for a second cell in all the cells during a second sub frame in the radio frame, and so on. This basically makes all the cells become one and a same cell. Compared to the solution presented in FIG. 3, the antenna gain for dedicated transmission is a factor 3 worse, assuming M=3. The power consumption for dedicated traffic (Joule/bit) is consequently three times higher.

In this embodiment, the REC 105 or some other unit of the data communication scheduling system 300 can therefore judge when to go from this configuration with a single active multi-cell RE 104 to three active REs 101, 102, 103 and transmitters 111, 121, 131 based on a simple formula:

$$3 \times \text{Power(RE static)} + \text{traffic} \times \text{Power(traffic)} \times \text{Efficiency(RE)} \quad \text{3 RE:}$$

$$1 \times \text{Power(RE static)} + \text{traffic} \times \text{Power(traffic)} \times \text{Efficiency(RE)} \times 3 \quad \text{1 multi-cell RE:}$$

The formula can of course be amended based on the number of active transmitters 171 in the multi-cell RE 104 and the number of transmitters 111, 121, 131 in each normal RE 101, 102, 103.

The operation of the receiver antenna system multiplexer 140 and the receiver controller 145 is basically the same in this embodiment as compared to the embodiment illustrated in FIG. 3.

FIG. 4 also illustrates an alternative implementation of the receiver status controller 164, 166, 168 and the transmitter status controller 163, 165, 167. Instead of having these functionalities implemented in the REC 105 as in FIG. 3, each RE 101, 102, 103 can have its dedicated receiver and transmitter status controller 164, 166, 168; 163, 165, 167 for selectively and temporarily turning of the power the receivers 112, 122, 132 and the transmitters 111, 121, 131.

In operation of the radio base station 100, all the transmitters 111, 121, 131 are preferably turned off and only the transmitter 171 of the multi-cell RE 104 is active if the data communication scheduling is applied to all three cells. Alternatively, one of the transmitters 111 can be active if the traffic load in the cell to which the transmitter 111 is dedicated is particularly high as compared to the other two cells in this embodiment. In such a case, the transmitter 171 of the multi-cell RE 104 can be shared between the other two cells and thereby switches between broadcasting data relevant for these two cells.

Correspondingly, one or two of the receivers 122, 132 are turned off by the receiver status controllers 166, 168 so that the remaining receiver or receivers 112 handle all the uplink traffic for the cells as described above in connection with FIG. 3. This means that the antenna gain for the uplink will be same as for normal operation as the active receiver 112 only listens to one antenna arrangement 110, 120, 130 at a time. The same link budget is therefore achieved as for normal operation and the user equipment does not need to increase its output power.

Figure 12:
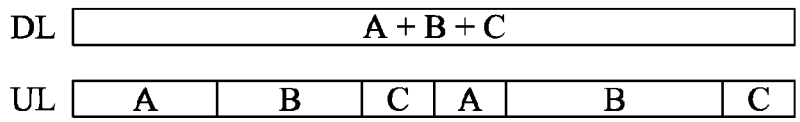
FIG. 12 schematically illustrates omni transmission downlink and time multiplexing uplink according to an embodiment.

FIG. 12 schematically illustrates a radio frame for the uplink and the downlink and the assignment of sub frames to the three different cells denoted A, B and C in the figure. In this embodiment, the downlink transmission is broadcast to all cells, while the receiver is time multiplexed between the cells.

Figure 13:
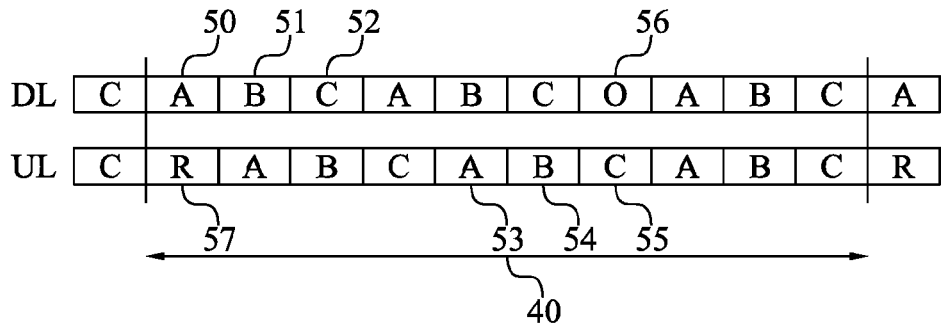
FIG. 13 illustrates an embodiment of a radio frame with scheduled transmission and reception with omni transmission downlink and time multiplexing uplink.

The data frame structure for this configuration is shown in more detail in FIG. 13. In a preferred implementation, one uplink sub frame 57 in the radio frame 40 is used for RACH. This RACH sub frame 57 should then be able to receive data from all cells, as random access can be transmitted by user equipment in any of the served cells. The receiver antenna system multiplexer 140 consequently connects the active receiver 112 to all the antenna interfaces 115, 125, 135 and antenna arrangements 110, 120, 130 dedicated to the cells during this sub frame 57. The RACH is very tolerant to the link budget but other uplink traffic scheduled to that sub frame 57 should take the decreased antenna gain into calculation in the link adaptation.

Except for the RACH sub frame 57, all the nine other sub frames are available for free usage in any of the cells. However, as noted above, the scheduling of uplink and downlink sub frames should be configured so that the ACK/NACK of a downlink transmission in a cell is received preferably four sub frames later in the uplink. Therefore, any scheduled transmission in the downlink should be accompanied with a corresponding possibility to receive in the uplink four sub frames later for that cell.

FIG. 13 illustrates an example where the traffic load is equal in the different cells. In sub frame 0 50, the radio base station transmits to users in cell A, though in the form of a broadcast transmission that also reaches the other cells B, C. In sub frame 4 53, the receiver antenna system multiplexer 140 is controlled by the receiver controller 145 to forward data received by the antenna 110 of cell A to the active receiver 112 to thereby be able to receive the ACK/NACK from any user equipment in cell A. Correspondingly, broadcast transmissions of data destined to any user equipment in cell B and C are carried by sub frames 51, 52 having their scheduled corresponding uplink sub frames 54, 55 at the predefined sub frame distance to receive any ACK/NACK from user equipment.

The downlink sub frame 56 present the pre-defined sub frame distance prior the RACH sub frame 57 can be used for transmission of data destined in any of the cells or indeed in any combination of two or more cells.

Although not illustrated in the figure, the downlink sub frame scheduling could be conducted so that the transmission at sub frames X and X+5 are destined to one and the same cell, thereby corresponding to the sub frames carrying the PBCH, PSS and SSS for the cell. Optionally, two consecutive sub frames can be assigned for transmission of data destined to a same cell for at least some of the cells served by the radio base station 100.

However, in a preferred implementation of the omnitransmission, a new cell is formed covering the coverage area of the M, such as three, cells. This means that dedicated system information, i.e. information carried by the PBCH, PSS and SSS, can be transmitted during the low power consumption mode. This dedicated system information could be new system information or the system information traditionally used in one of the M cells. In order to have a smooth transient, system information of both this new cell and the M cells could be transmitted on the multi-cell RE with a slow fading out of the signal carrying the system information of the M cells on that RE. A handover between cells can then be handled more safely.

Compared to the solution with transmitter antenna system multiplexer, the channel estimation is generally better. However, time multiplexing in the downlink as in FIG. 3 significantly improves the antenna gain and decreases the interference caused in neighboring cells. The dynamic power consumption will also be ⅓ as compared to the omnidirectional downlink transmission. However, implementation of transmitter antenna system multiplexers leads to additional costs as they must be able to affect the switch on a high power signal, i.e. after power amplification. This should be compared to a receiver antenna system multiplexer that performs the switch on low power. The cost of the equipment in the transmitter antenna system multiplexer is generally more expensive as compared to the receiver antenna system multiplexer.

Figure 16:
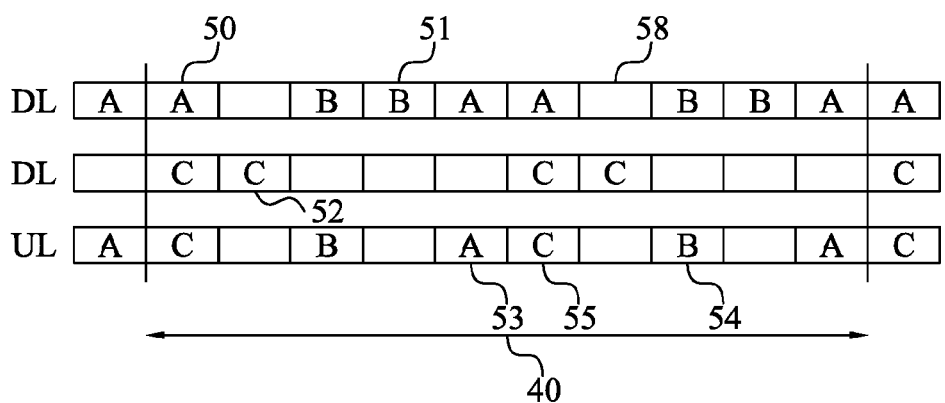
FIG. 16 illustrates another embodiment of a radio frame with scheduled transmission and reception with time multiplexing downlink and uplink.

In order to improve the channel estimation possibility of the user equipment with embodiment illustrated in FIG. 3, two of the three transmitters 111, 131 can be active so that the transmitter status controller 161 thereby only turns off the power of one of the transmitters 121. It is then possible to schedule two sets of consecutive sub frames for each of the cells as is illustrated in FIG. 16. These four downlink sub frames 50, 51, 52 that are assigned to the cells therefore correspond to sub frames 0, 4, 5 and 9 in each cell. The first active transmitter 111 is then connected between the antenna interface 115 dedicated for the first cell A and the antenna interface 125 of the second cell B. The other active transmitter 131 is connected to the antenna interface 135 of the third cell C. There are several empty sub frames 58 in the figure. These sub frames can be used for selectively interconnecting either the first transmitter 111 or the second transmitter 131 to any of the antenna interfaces 115, 125, 135 to allow transmission of data for the different cells.

As is seen in the figure, it is not possible with this embodiment to have a scheduled uplink sub frame 53, 54, 55 four sub frames later than each of the downlink sub frames 50, 51, 52 assigned to the cells in the radio frame 40. The scheduling of the uplink sub frames 53, 54, 55 by the receiver controller 145 is therefore preferably conducted so that each cell is assigned an uplink sub frame 53, 54, 55 present four sub frames later than the sub frame 0 for that cell.

An advantage of this embodiment is that two antenna multiple-input and multiple-output (MIMO) transmissions can be used for 20-40% of the sub frames, depending on the particular cell. This will allow maximum usage of time instant of good radio conditions to user equipment.

Figure 17:
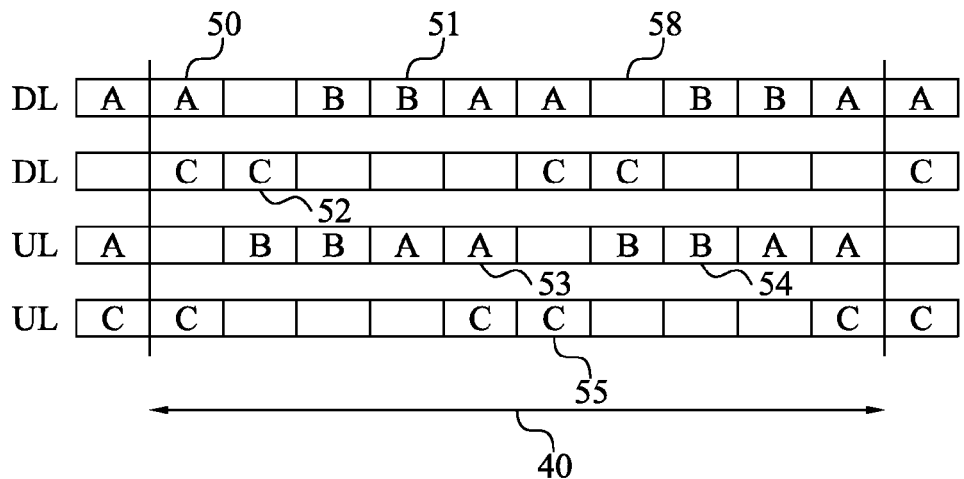
FIG. 17 illustrates a further embodiment of a radio frame with scheduled transmission and reception with time multiplexing downlink and uplink.

A natural extension to the embodiment illustrated in FIG. 16 is to also have two active receivers for the radio base station, which is illustrated in FIG. 17. Each set of two consecutive scheduled downlink sub frames 50, 51, 52 can then be followed respective uplink sub frames 53, 54, 55 scheduled four sub frames later than the downlink sub frames 50, 51, 52 for the same cell.

In FIGS. 12 to 17, the downlink and uplink transmission are typically conducted using different carrier frequencies. This also applies to FIGS. 16 and 17 having two parallel downlink radio frames (FIGS. 16 and 17) and two parallel uplink radio frames (FIG. 17). Thus, different downlink and uplink frequencies can be used for the parallel downlink and uplink transmissions, which is well known in the art.

Figure 5:
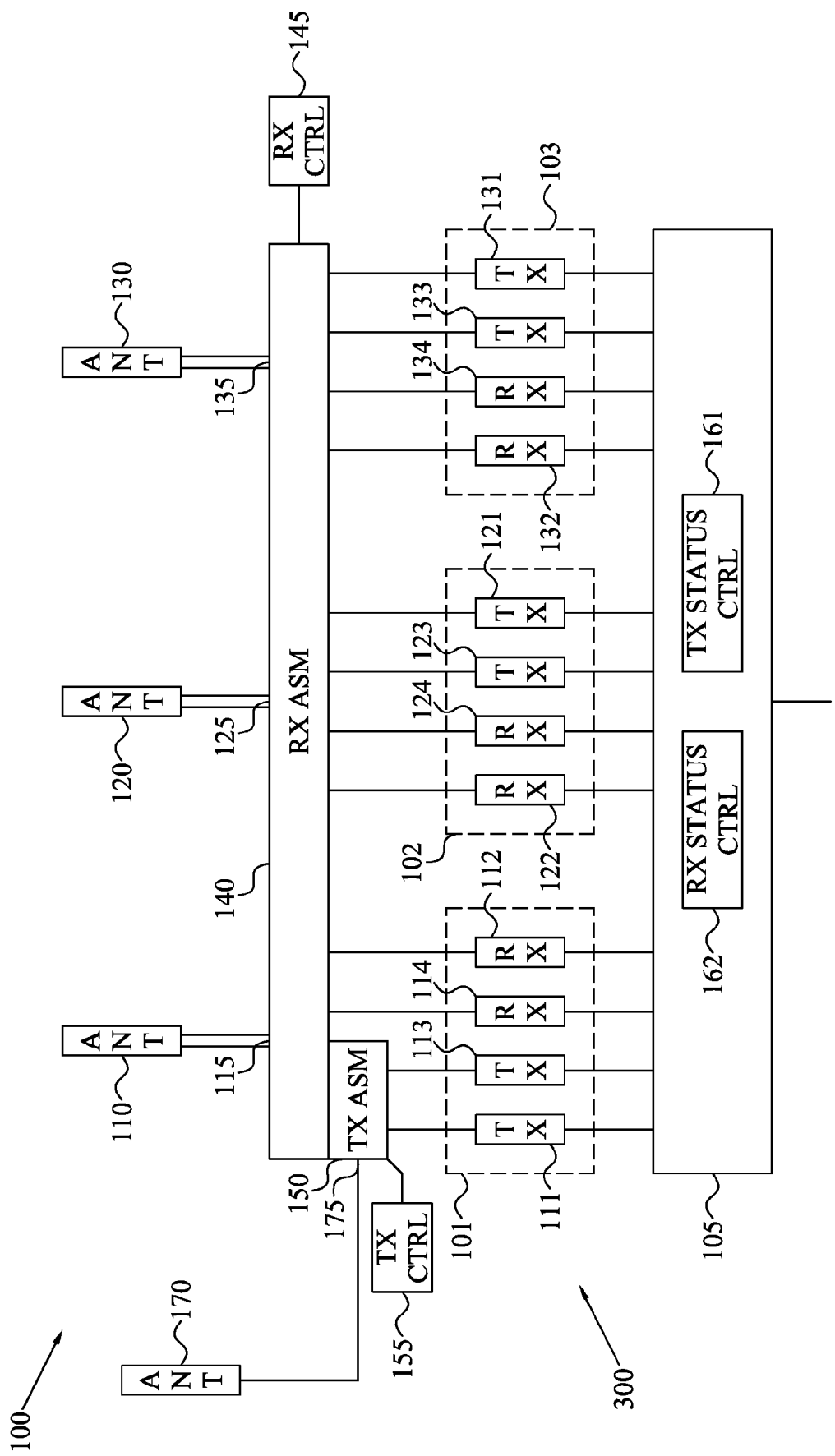
FIG. 5 illustrates a portion of a radio base station according to a further embodiment.

The embodiments of FIGS. 16 and 17 are in particular suitable for a radio base station 100 and data communication scheduling system 300 as illustrated in FIG. 5 having multiple, two in the figure, transmitters 111, 113, 121, 123, 131, 133 and receivers 112, 114, 122, 124, 132, 134 per RE 101, 102, 103. In such a case, only one RE 101 need to be active to provide time multiplexing with two transmitters 111, 113 and/or two receivers 112, 114 using a receiver antenna system multiplexer 140 and transmitter antenna system multiplexer 150. In an alternative embodiment, each RE 101, 102, 103 only comprises one transmitter 111, 121, 131 and receiver 112, 122, 132 each. Each cell then has multiple, two for the example illustrated in FIG. 5, REs 101, 102, 103 per cell.

FIG. 5 also illustrates an alternative implementation using an omnidirection antenna arrangement 170. In contrast to FIG. 4, no dedicated multi-cell RE is needed but one or more transmitters 111, 113 in one or more of the normal REs 101, 102 are instead connected to the antenna arrangement 170 through the transmitter antenna system multiplexer 150 and the antenna interface 175.

In a typical implementation embodiment, the receiver status controller 162 and the transmitter status controller 161 turn off the power of the receivers 122, 124, 132, 134 and transmitters 121, 123, 131, 133 in two of the three available REs 102, 103. The two remaining active receivers 112, 114 are selectively interconnected to the antenna interfaces 115, 125, 135 dedicated to the cells through the operation of the receiver antenna system multiplexer 140 and the receiver controller 145. In the lower power mode, the transmitter antenna system multiplexer 150 and transmitter controller 155 are arranged for selectively connecting the two active transmitters 111, 113 to the omnidirectional antenna interface 175, while during normal operation they are connected to one of the normal antenna interfaces 115.

The features of the embodiments illustrated in FIGS. 3 to 5 may combine. For instance, usage of multiple receivers 112, 114, 122, 124, 132, 134 and transmitters 111, 113, 121, 123, 131, 133 per RE 101, 102, 103 as illustrated in FIG. 5 can be used in any of the data communication scheduling system 300 illustrated in FIGS. 3 and 4. Correspondingly, multiple REs per cell can be applied to any of the embodiments. The at least one receiver status controller 162, 164, 166, 168 and the at least one transmitter status controller 161, 163, 165, 167 can be arranged in the REC 105 as in FIGS. 3 and 5 or in the REs 101, 102, 103 as in FIG. 4. Furthermore, the load estimator 180 illustrated in FIG. 3 can also be implemented in the data communication scheduling system 300 of FIGS. 4 and 5.

In FIGS. 4 and 5, a separate dedicated omnidirectional antenna arrangement has been used for broadcasting data to the cells served by the radio base station. In an alternative approach, the M antenna arrangements of the radio base stations can be used to thereby simultaneously transmit the same data in all M cells. The data communication scheduling system then comprises a transmitter antenna system multiplexer interconnecting the M antenna arrangements through their respective antenna interfaces with the $N_{TX}$ transmitters that are active and used for the data transmission during the low power consumption operation.

The signal diagrams discussed above and illustrated in FIGS. 12 to 17 have mainly been focused on the Frequency Division Duplex (FDD) mode of LTE. However, embodiments are also fully applicable to a Time Division Duplex (TDD) system, such as the TDD mode of LTE.

The upper portion of FIG. 23 illustrates one mode TDD defined for LTE TDD. A radio frame 40 consists of 3 UL sub frames 53, 6 DL sub frames 50 and 1 special sub frame (SSF) 59A. As is known in the art, the first portion of the SSF 59A is used for downlink transmissions and the last portion of the sub frame 59A is employed for uplink transmissions. In this TDD mode, the SSF 59A is the second sub frame in the TDD LTE radio frame 40.

Today synchronization information intended to user equipment is transmitted in SF0 (A-DL1), part of SF1 (A-SSF), SF5 (A-DL2) and SF6 (A-DL3).

In order to save power of the radio base station, in an embodiment two cells share radio equipment as is schematically illustrated in FIG. 23. The first cell is denoted A and its traditional radio frame distribution is illustrated in the upper portion of the figure, with the traditional radio frame distribution of the second cell B in the middle portion of the figure. This embodiment also takes into consideration that a downlink transmission in SF0 (A-DL1) has a corresponding ACK sent uplink in SF4 (A-UL3) and that an uplink transmission in SF4 (A-UL3) preferably has a corresponding uplink grant transmitted in SF0 (A-DL1). The second cell B uses a corresponding relationship between B-DL5 and B-Ul1.

The lower portion of FIG. 23 illustrates the radio frame scheduling using one shared radio equipment, i.e. transmitter and receiver, for the two cells. One of the sub frames 58 can either be empty or be used in any of the cells. Any further cell of the radio base station would then use one or more other REs.

A challenge with TDD is that the downlink transmissions from one radio base station will cause interference in the uplink reception in another radio base station. If a neighboring radio base station uses the timing of the cell A in the upper portion of the figure above, it should omit to use the sub frame SF9 (A-DL6) as it would interfere with the reception in cell B.

If the HARQ protocol is used according to the LTE standard, user equipment should transmit an ACK in the uplink. According to this standard, this would lead to only having one downlink sub frame per cell to transmit on as only one uplink sub frame 53, 54 exists for the two cells A, B in the radio frame 40 illustrated in FIG. 23.

The HARQ protocol for LTE allows for an optimistic link adaptation as retransmissions are fast. In TDD, retransmissions are made 1 frame after the original transmissions and consequently do not affect the embodiments as its frame structure can easily be repeated every radio frame. However, in the FDD mode, the uplink retransmissions are done 8 sub frames after the initial transmission and the uplink HARQ ACK is expected four time slots or sub frames after every transmission. A missing uplink HARQ ACK leads to a retransmission.

FIG. 24 illustrates how the HARQ protocol can be applied to an embodiment using LTE FDD mode. In such a case, the HARQ retransmission will limit which sub frames are used in which cells, thereby reducing the flexibility slightly.

FIG. 24 illustrates the uplink retransmissions scheduling and uplink HARQ ACK/NACK signaling for the sub frames indicated with a, A, b, B, c, C and x. Note that in the figure, sub frame A 50 is regarded as SF0 for cell A, sub frame B 51 is regarded as SF0 for cell B and sub frame C 52 is SF0 for cell C. The first uplink HARQ ACK/NACK instant for the A sub frame is indicated with A1, a second, if necessary, instant is indicated with A2 and so on. Sub frame A1/c1 denotes the sub frame where either uplink HARQ ACK/NACK for sub frame A or c can be transmitted, etc. Note that an ACK/NACK transmission in cell A cannot be sent when both transmitters are being used for transmission for other cells, B and C, as the three cells share two transmitters in this embodiment.

Also note that the transmission instants on the same HARQ process is done 8 sub frames after the preecind transmission. This means that the figure shows a compressed time line: A1 is correctly drawn but A2 actually happens one radio frame later, A3 yet another radio frame later.

The embodiment illustrated in FIG. 24 is adapted for the HARQ processing scheme defined in 3GPP release 8. However, the teachings of the present embodiments can of course be applied to other HARQ schemes and later revisions of the current LTE HARQ standards.

The particular numbers of the parameters M, $M_{TX}$, $M_{RX}$, $N_{TX}$, $N_{RX}$ presented above should merely be seen as illustrative and non-limiting examples of the scope of the embodiments.

The transmitter and receiver antenna system multiplexers map the transmitters and the receivers of the data communication scheduling system to different antenna interfaces. The transmitter and receiver antenna system multiplexers can be implemented in many different embodiments depending on the number of antenna interfaces, i.e. the parameter M, the number of REs and the number of transmitters and receivers per RE, i.e. the parameters $M_{TX}$, $M_{RX}$, and the number of configurations to support between the minimum configuration, i.e. one transmitter and one receiver for all antenna interfaces, and the maximum configuration, i.e. one RE per antenna interface. Basically, the transmitter and receiver antenna system multiplexers can be built using units selected among real time controllable radio frequency (RF) switches, RF splitters, RF amplifiers and RF filters.

Figure 6:
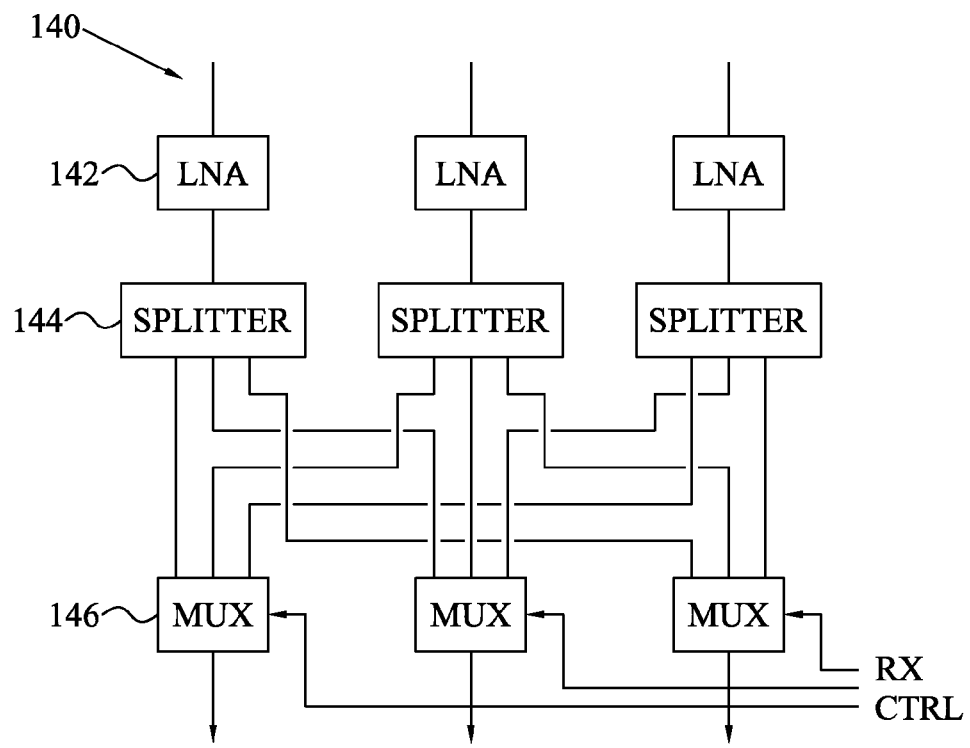
FIG. 6 illustrates an implementation of the receiver antenna system multiplexer in FIGS. 3 to 5 according to an embodiment.

FIG. 6 is an illustration of an embodiment of a receiver antenna system multiplexer 140. This embodiment comprises a respective low noise RF amplifier (LNA) 142 at each antenna input, a respective RF splitter 144 for generating as many copies of the amplified signal from the LNA 142 as there are connected receivers. A respective RF multiplexer (MUX) 146 is arranged at the receiver input for selecting one of the antenna signals. These RF multiplexers 146 are controlled on micro second level by the receiver controller as indicated in the figure.

In a general embodiment, the receiver antenna system multiplexer 140 therefore comprises M RF amplifiers 142 connected to a respective antenna interface. Each RF amplifier 142 is connected to a respective RF splitter 144 arranged for splitting the amplified RF signal from the connected RF amplifier 142 into $M_{RX}$ signal copies. $M_{RX}$ RF multiplexers 146 have respective inputs connected to each of the M RF splitters 144 and having a respective output connected to a respective receiver of the $M_{RX}$ receivers in the data communication scheduling system.

Figure 7:
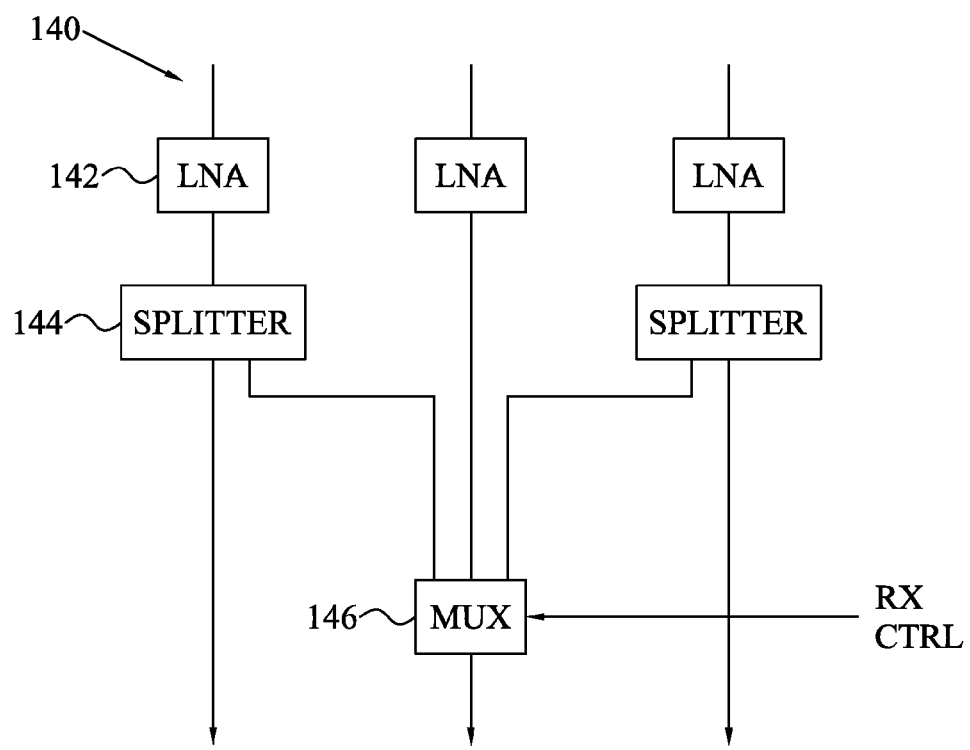
FIG. 7 illustrates an implementation of the receiver antenna system multiplexer in FIGS. 3 to 5 according to another embodiment.

FIG. 7 illustrates an alternative receiver antenna system multiplexer 140 optimized for one shared receiver and remaining receivers, two in this example, operable on a respective dedicated antenna arrangement. In similarity to FIG. 7, each antenna interface preferably has a connected low noise RF amplifier 142. In the figure, RF splitters 144 are connected to two of the RF amplifiers 142 and employed for splitting the input amplified RF signal into two signal copies. A single RF multiplexer 146 has inputs connected to the RF splitters 144 and directly to the remaining RF amplifier 142 that does not have to, but may, have a RF splitter 144.

Figure 8:
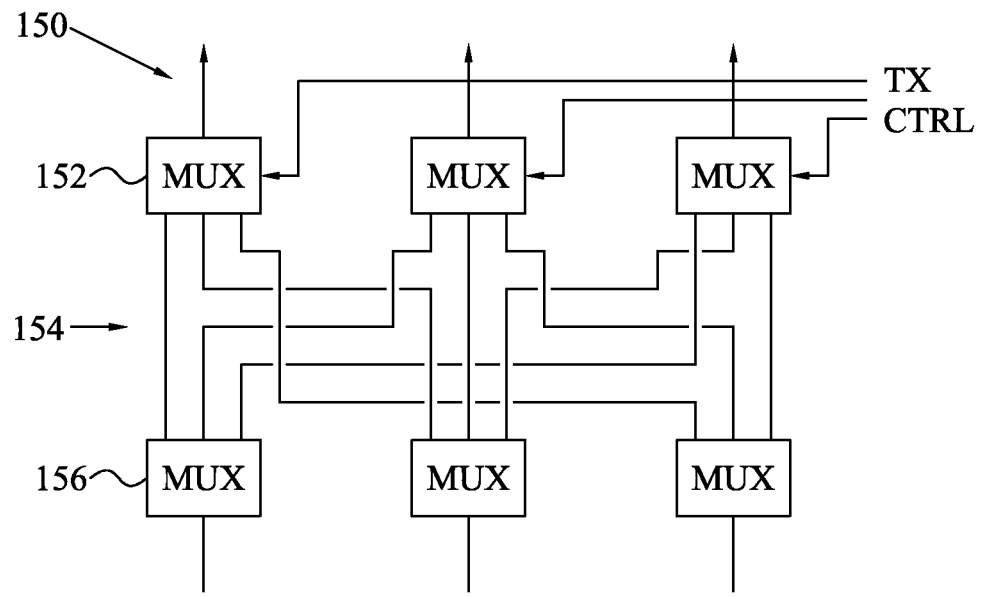
FIG. 8 illustrates an implementation of the transmitter antenna system multiplexer in FIG. 3 according to an embodiment.

FIG. 8 is an illustration of a transmitter antenna system multiplexer 150 according to an embodiment. The transmitter antenna system multiplexer 150 comprises $M_{TX}$ RF multiplexers 156, each connecting to a respective transmitter of the data communication scheduling system. A corresponding set of M RF multiplexers 152 or RF filters are connected at the antenna interfaces. The two set of multiplexers 152, 156 are interconnected through a combiner network 154, where the output from each transmitter and multiplexer 156 is combined per antenna interface and multiplexer 152.

The optional set of M RF filters (not illustrated) may be used for cleaning the RF signal from any distortion caused by the transmitter antenna system multiplexer 150. Alternatively, the RF filters can be combined with the normal transmitter band pass filter to minimize the total loss.

Figure 9:
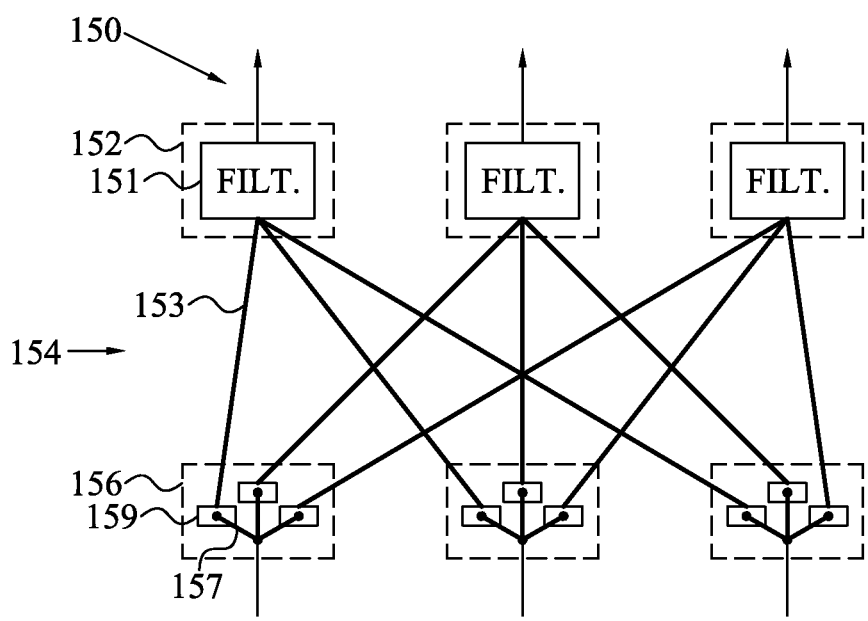
FIG. 9 illustrates an implementation of the transmitter antenna system multiplexer in FIG. 3 according to another embodiment.

FIG. 9 is an implementation example of the transmitter antenna system multiplexer 150 illustrated in FIG. 8. The RF multiplexers 156 are implemented as a set of PIN diode switches 159. The bold lines 153, 157 in the RF multiplexers 156 and the combiner network 154 represent physical traces with a length corresponding to a fourth of the wavelength. By having these tuned, no RF multiplexers 152 are actually needed on the antenna arrangement sides. The figure consequently illustrates the optional RF filters 151 mentioned above to interconnect the combiner network 154 with the antenna interfaces.

Figure 10:
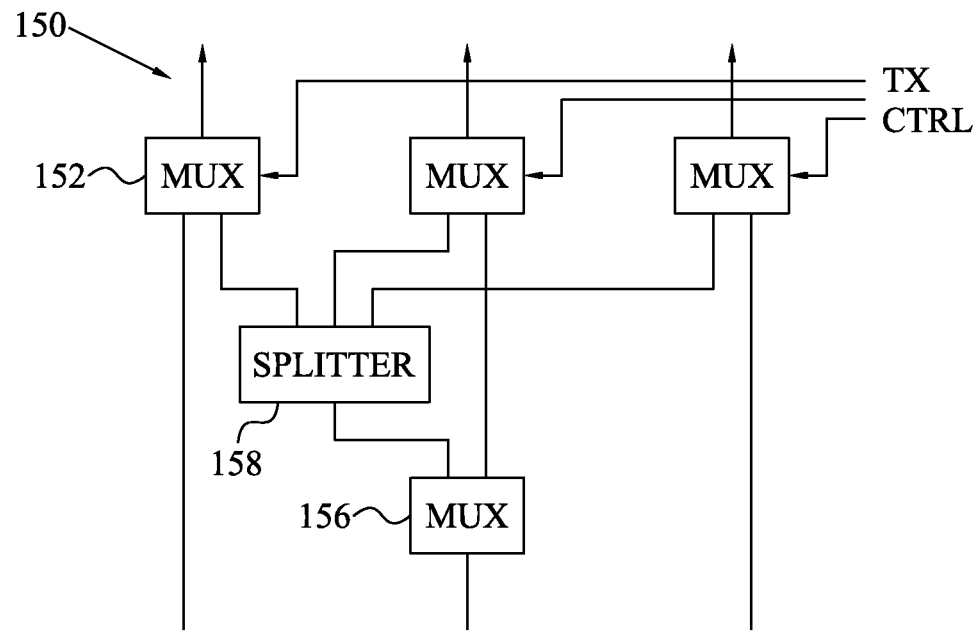
FIG. 10 illustrates an implementation of the transmitter antenna system multiplexer in FIG. 3 according to a further embodiment.

FIG. 10 is an illustration of a transmitter antenna system multiplexer 150 that can be used in connection with broadcasting data to the multiple cells served by the radio base station. The transmitter antenna system multiplexer 150 comprises a respective RF multiplexer 156 connected to the transmitter output of the $N_{TX}$ active transmitters ($N_{TX}$=1 in the figure). Correspondingly, M RF multiplexers 152 are connected to the respective antenna interfaces. $N_{TX}$ RF splitters 158 are arranged in the transmitter antenna system multiplexer 150 so that each RF splitter 158 is interconnected between one of the transmitter-connecting RF multiplexers 156 and the M RF multiplexers 152. The respective RF splitter 158 divides the input RF signal into M copies that are sent on the M antenna arrangements to achieve an omni- and broadcast-like transmission of the same data to multiple served cells.

Figure 11:
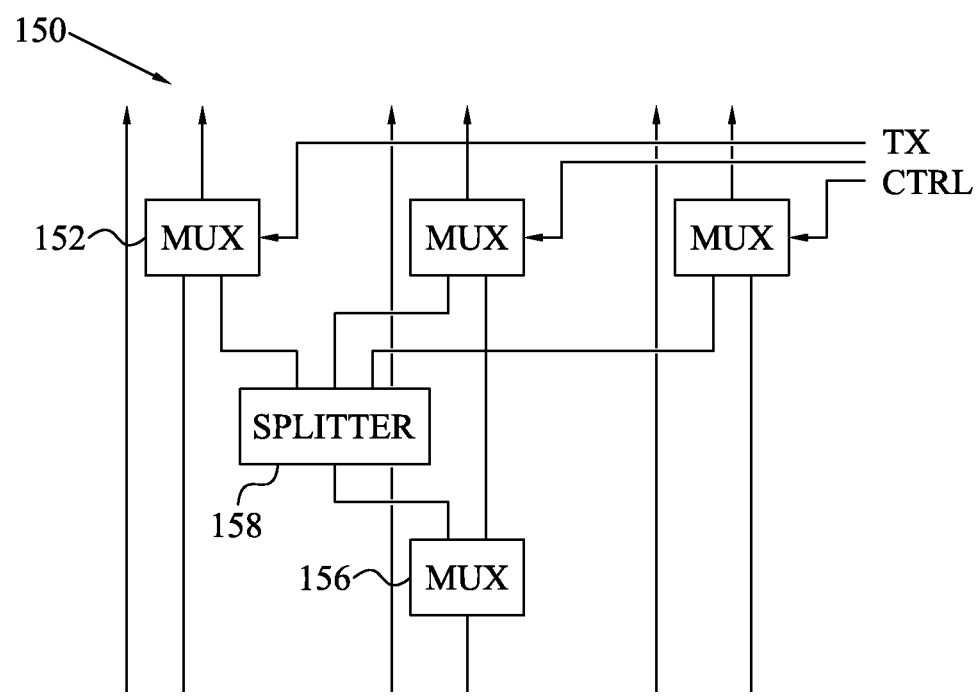
FIG. 11 illustrates an implementation of the transmitter antenna system multiplexer in FIG. 3 according to yet another embodiment.

FIG. 11 illustrates an alternative implementation for a radio base station having six antenna arrangements, three serving cells and two transmitters per cell. The transmitter antenna system multiplexer 150 may then be arranged for interconnecting one transmitter per cell with one antenna interface per cell. This means that one antenna arrangement per cell is connected through the transmitter antenna system multiplexer 150 and the other antenna arrangement per cell is directly connected to its transmitter. In low power consumption and low traffic load situations requiring, for instance, only one active transmitter per cell, the signals could then by-pass the RF multiplexers 152, 156 and thereby reduces the RF losses. In other low power consumption situations requiring less than one transmitter per cell or more than one transmitter per cell but not all six transmitters, the signals are transmitter through the RF multiplexers 152, 156.

This concept of bypassing multiplexers can of course also be applied to the other embodiments of the transmitter antenna system multiplexer and receiver antenna system multiplexer disclosed herein.

In order to illustrate the advantages of the present invention, some examples of power consumptions in a radio base station are given herein.

In these examples, it is assumed that a RE has a static power consumption of 100 W and efficiency for dynamic traffic of 20%. This means that transmitting X W consumes 5X W. Furthermore, 5 W per cell is used for common channels.

Therefore, for 50 W output power a total power of 5×50+100=350 W is consumed.

Further, assume also that the transmitter antenna system multiplexer adds another 1.5 dB loss in the transmitter path. This will then decrease the efficiency for dynamic traffic, and to transmit X W, a total of 7X W is consumed.

In order to have a fair comparison between the capacity, the radio base station can serve in different scenarios of RE sharing and the following assumptions can be made:

The average capacity of a cell is less than ⅓ of the maximum capacity, due to the 1-1 reuse. It can be assumed that no major capacity loss is found if only having the radio resources ½ of the time, and a coordinated usage. The radio resources can be any of the following two: ½ the time, with full power and all frequencies or ½ the frequency, with full power and all the time.

For simplicity, it is assumed that ¼ of the resources gives 50% capacity, ⅛ gives 25% capacity, etc. This is a pessimistic view on the traffic capacity as the main contribution, the interference, decreases as well. The linear approximation is probably rather good below ⅓ usage, if 3 cells per site are used. We then end up in 1-3 reuse. Below ⅓ capacity, there is no use to transmit in more than one sector at a time.

The path loss is proportional to the radius to the power of 3.5, $r^{3.5}$. This is a good first approximation and at evenly distributed traffic, the power needed to serve the traffic, in average, is then:

50% power=>82% of the radius, or 68% of the traffic
40% power=>77% of the radius, or 60% of the traffic
30% power=>71% of the radius, or 50% of the traffic
20% power=>63% of the radius, or 40% of the traffic
10% power=>50% of the radius, or 25% of the traffic This is assumed that the same service is promised throughout the cell.

Omnidirectional Downlink With Transmitter Antenna System Multiplexer

In this embodiment, the radio base station is assumed to serve three cells, having three REs but each RE comprises two transmitters and two receivers. It is also assumed that two transmitters and two receivers are active and shared between the cells, while the remaining transmitters and receivers are turned off according to the invention.

Reference configuration:
Static load: 6×(100+5×2.5)=675 W
Traffic load: 5X W, where X is the power in a cell
Transmitter antenna system multiplexer configuration:
Since all downlink signals are sent to all cells, the dynamic power consumption is 3 times the RE own dynamic load:
Static load: 2×(100+3×7×2.5)=305 W
Traffic load: 3×7X=21X W In the reference configuration, 95 W is left for traffic per sector as the common channels consume 5 W.

If we assume the same transmitters are used in the transmitter antenna system multiplexer configuration, we have (100−1.4×3x)/1.4=56.4 W left for traffic. Note that this will be shared among the cells, resulting in a comparable output power as seen by any specific user equipment as 56/3=19 W.

For any user equipment at the cell edge, this corresponds to 19/95=20% of the bitrate. For an evenly distributed traffic in the cell, the capacity is slightly below 40%.

This means that for up to 40% traffic load in the cell, it is sufficient with the omnidirectional downlink with transmitter antenna system multiplexer.

For 40% traffic load, the power per cell is 19 W and the total power consumption will be:
Reference case: 675+5×19=770 W
Transmitter antenna system multiplexer case: 305+21×19=700 W Thus, at 40% traffic load, the total power consumed by the radio base station is 10% lower with the invention and the static power consumption is less than half as compared to the reference case.

For 25% traffic load, it is sufficient with 10% power, or about 10 W:
Reference case: 675+5×10=725 W
Transmitter antenna system multiplexer case: 305+21×10=515 W Time Multiplexed Downlink With Transmitter Antenna System Multiplexer In this embodiment, the radio base station is assumed to serve three cells, having three REs but each RE comprises two transmitters and two receivers. It is also assumed that all transmitters and receivers can be shared between the cells. However, only two transmitters and two receivers are active, while the remaining transmitters and receivers are turned off according to the invention. In the reference configuration all six transmitters and receivers are turned on.

A transmitter antenna system multiplexer loss of 1.5 dB loss, 30% loss, is assumed.

Reference configuration:
Static load: 6×(100+5×2.5)=675 W
Traffic load: 5X W, where X is the power in a cell
Transmitter antenna system multiplexer configuration:
Static load: 2×(100+3×7×2.5)=305 W
Traffic load: 7X W In this example, we have two transmitters and receivers serving three cells. Any of the cells can have at maximum 12 out of 20 SF, see FIG. 17. In average each cell has ⅓ of the transmission resources of one cell.

For any user equipment at the cell edge, only 12/20=60% of the bitrate is achieved, but for an average load, ⅓ of the resources are available which, according to above assumptions, corresponds to up to 65% capacity.

According to the assumption above, this corresponds to about 45% of the power or 45 W.

For 65% traffic load, the power per cell is 45 W and the consumption will be:
Reference case: 675+5×45=900 W
Transmitter antenna system multiplexer case: 305+7×45=620 W For 25% traffic load, it is sufficient with 10% of the power or 10 W:
Reference case: 675+5×10=725 W
Transmitter antenna system multiplexer case: 305+7×10=375 W Thus, under the above given assumptions, Omni- and broadcast-based downlink using a transmitter antenna system multiplexer is useful for sites where the traffic load is assumed to be less than 40% for the vast majority of the time. Time multiplexed downlink using two active transmitters/receivers shared between the three served cells is, however, useful for most sites, as an average load of 65% can easily be handled.

Figure 18:
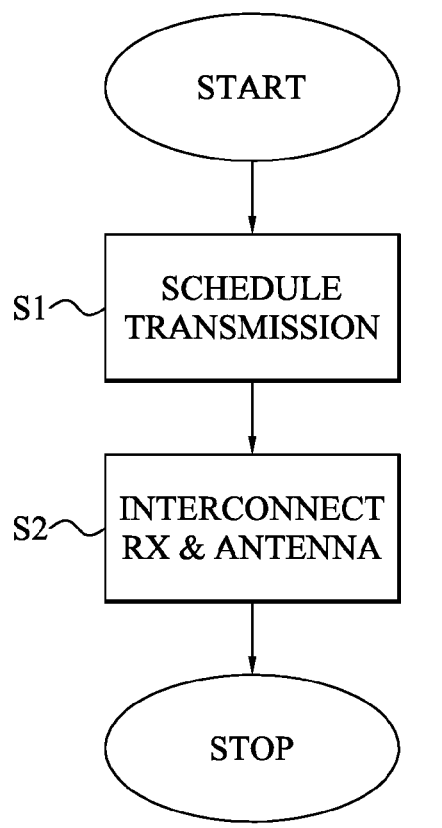
FIG. 18 is a flow diagram illustrating a data communication scheduling method according to an embodiment.

FIG. 18 is a flow diagram illustrating a method for scheduling data communication by a radio base station as disclosed herein. The method starts in step S1, where data transmission is scheduled by the radio base station for the M served cells during a radio frame using $N_{TX}$ transmitters of the $M_{TX}$ transmitters arranged in the radio base station. This data transmission scheduling of step S1 is performed so that at least one of the $N_{TX}$ transmitters transmits data destined to user equipment in a first of the M cells during at least one sub frame in the radio frame and transmits data destined to user equipment in a second of the M cells during at least one other sub frame in the radio frame. Furthermore, each cell of the M cells is, in the scheduling of step S1, assigned at least one sub frame of the radio frame for transmission of data destined to user equipment in the respective cell.

A next step S2 selectively connects a receiver of $N_{RX}$ active receivers among $M_{RX}$ receivers arranged in the radio base station to an antenna arrangement of M antenna arrangements arranged in the radio base station. This selective interconnecting causes at least one of the $N_{RX}$ receivers to be connected to a first antenna arrangement during at least one sub frame of the radio frame and connected to a second antenna arrangement during at least one other sub frame of the radio frame. Furthermore, the selective interconnection causes the antenna arrangement of each cell to be connected to one of the $N_{RX}$ active receivers during at least one sub frame assigned for reception of data for that cell and present at a predefined sub frame distance from the sub frame assigned to that cell for data transmission in step S1.

The method then ends. It is though expected that the data scheduling method illustrated in FIG. 18 can be repeated for multiple consecutive radio frames. In such a case, the same scheduling and distribution of sub frames for the cells and sharing of transmitters and receivers can be used for all these radio frames. Alternatively, the scheduling can be updated between different radio frames, for instance to take into account increasing traffic demands in one of the cells and/or decreasing traffic demands in one of the cells.

Figure 19:
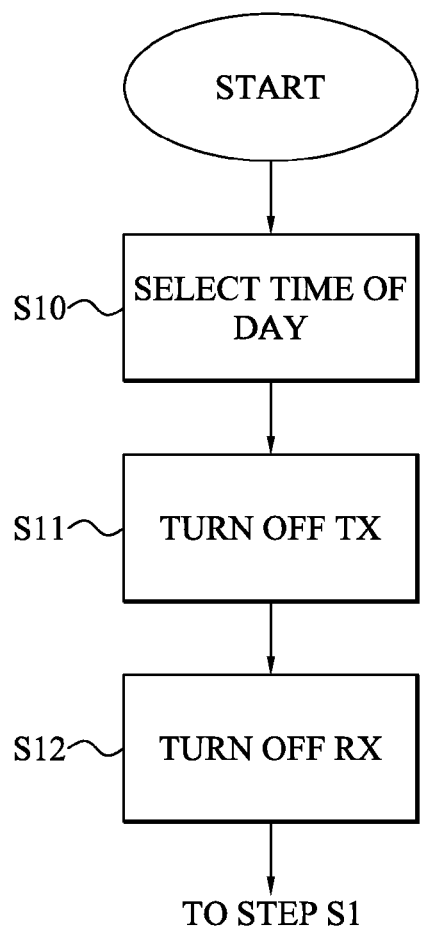
FIG. 19 is a flow diagram illustrating additional, optional steps of the data communication scheduling method according to an embodiment.

FIG. 19 is a flow diagram illustrating additional, optional steps of the data communication scheduling method in FIG. 18. The method starts in step S10, where a time interval of day is selected during which at least some of the transmitters and receivers of the radio base station are to be turned off in order to save power. This time interval is preferably selected to be an interval, where the expected traffic load is enough to be effectively handled with the remaining transmitter/transmitters and receiver/receivers that are shared between the served cells. Statistical evaluations of measured and/or estimated traffic loads during different times of day are preferably used as a basis for selecting the time period in step S10. The next two steps S11, S12 turn off the power of $M_{TX}$-$N_{TX}$ transmitters and $M_{RX}$-$N_{RX}$ receivers to thereby reduce the static power consumption by the radio base station. The method then continues to step S1 of FIG. 18, where data communication is scheduled using the remaining active $M_{TX}$ transmitters and $M_{RX}$ receivers.

Figure 20:
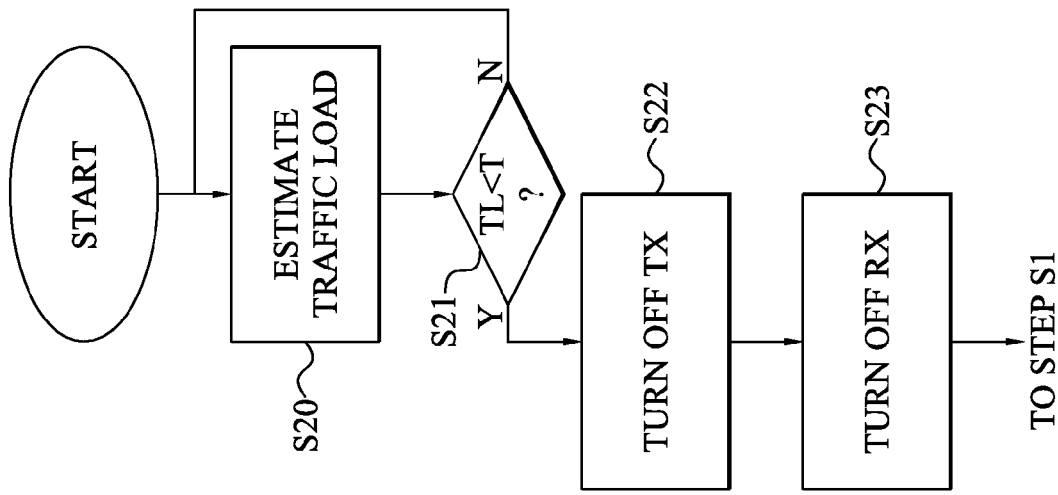
FIG. 20 is a flow diagram illustrating additional, optional steps of the data communication scheduling method according to another embodiment.

FIG. 20 is a flow diagram illustrating additional, optional steps of the data communication scheduling method of FIG. 18. The method starts in step S20, where the traffic load in the cells served by the radio base station is estimated. This estimation can, for instance, be based on information available to the MAC scheduler, which is generally aware of the traffic status in the cells, the amount of currently buffered data to and from the served user equipment. The estimated traffic load is then compared in step S21 with one or more traffic thresholds for the purpose of determining whether the expected traffic load in the cells is sufficient low to allow turning off at least some of the transmitters and receivers of the radio base station.

In a particular embodiment, the radio base station can either operate with the full number of transmitters and receivers on or with a fixed number of transmitters and receivers turned off. In such a case, only a single traffic threshold is needed.

Examples of such traffic thresholds have been given herein for the particular example situations described in the foregoing. The disclosure in connection with these examples can be used in order to calculate suitable traffic thresholds for other radio base station configurations besides the particular ones given in the examples.

If, however, the radio base station dynamically can turn off transmitters and receivers depending on the varying traffic demands, multiple traffic thresholds can be used in step S21. The total number of transmitters and receivers that can be safely turned off for a current traffic situation is then determined based on the comparisons of the estimated traffic loads and the multiple different traffic thresholds in step S21. The selected number of transmitters and receivers are then powered down and turned off in steps S22 and S23. The method then continues to step S1 of FIG. 18, where the data communication of the radio base station is scheduled for the remaining active transmitter/transmitters and receiver/receivers.

Figure 21:
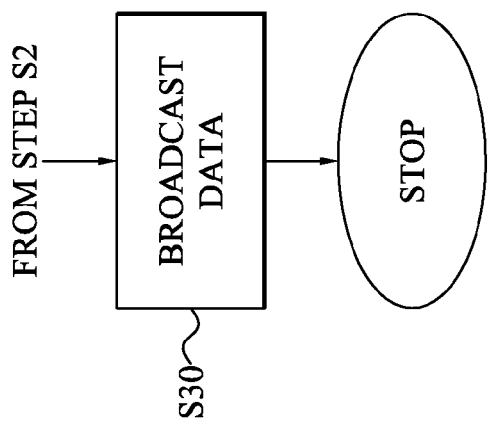
FIG. 21 is a flow diagram illustrating an additional, optional step of the data communication scheduling method according to an embodiment.

FIG. 21 is a flow diagram illustrating an additional step of the data communication scheduling method. The method continues from step S2 in FIG. 18. A next step S30 broadcasts data destined for user equipment in the served M cells using either an omnidirectional antenna arrangement connected to the active transmitter/transmitters or the M antenna arrangements dedicated for the served cells. In either case, the same data will be sent to all the cells in the relevant sub frames. By switching the data input so that the transmitted data is relevant for different cells during different sub frames, the downlink transmissions for all the cells can be served within a radio frame.

Figure 22:
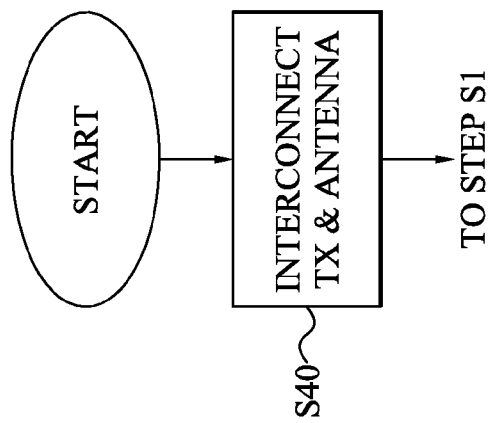
FIG. 22 is a flow diagram illustrating an additional, optional step of the data communication scheduling method according to another embodiment.

FIG. 22 is a flow diagram illustrating an additional step of the data communication scheduling method. The method starts in step S40, where a transmitter of the $N_{TX}$ active transmitters is selectively connected to an antenna arrangement of the M antenna arrangements according to a scheme so that each served cell has its dedicated antenna arrangement connected to one of the active transmitters during at least one sub frame of the radio frame. This switching of the outputs of active transmitters to the different antenna arrangements achieves sufficient downlink transmissions for the served cells and user equipment. The method then continues to step S1 of FIG. 18, where the data transmission is scheduled for the radio base station.

Thus, by sharing the same transmitters and receivers between multiple cells of a radio base station and utilizing the time division structure of the LTE air interface, a significant reduction in the static and also total power consumption can be achieved. In spite of this power consumption reduction, the resulting capacity in the shared configuration is still high.

This means that the traditional implementation of a LTE radio base station with two transmitters and receivers per cell does not give any substantial gain in capacity due to the interference. In clear contrast, for most traffic load situations, high capacity can be with only a subset of the transmitters and receivers active and turned on, thereby reducing the power consumption of the radio base station.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A data communication scheduling system adapted for arrangement in a radio base station serving at least M≥2 cells, said data communication scheduling system comprising:
   at least M antenna interfaces each connectable to an antenna arrangement of at least M antenna arrangements;
   $M_{TX}$ transmitters, wherein $M_{TX} \geq M$;
   $M_{RX}$ receivers, wherein $M_{RX} \geq M$, wherein at least one transmitter of said $M_{TX}$ transmitters and at least one receiver of said $M_{RX}$ receivers are assigned to each cell of said M cells, and wherein each transmitter of said $M_{TX}$ transmitters and each receiver of said $M_{RX}$ receivers is connectable to at least one antenna interface of said at least M antenna interfaces;
   a transmitter controller arranged for scheduling data transmission by said radio base station for said M cells during a radio frame comprising multiple sub frames using $N_{TX}$ transmitters of said $M_{TX}$ transmitters, wherein $1 \leq N_{TX} < M_{TX}$, wherein $M_{TX} - N_{TX}$ remaining transmitters of said $M_{TX}$ transmitters are turned off or inoperable during said radio frame, wherein said transmitter controller is arranged for scheduling at least one transmitter of said $N_{TX}$ transmitters for transmission of data destined for user equipment in a first cell of said M cells during at least one sub frame of said radio frame and transmission of data destined for user equipment in a second cell of said M cells during at least another sub frame of said radio frame, and wherein said transmitter controller is arranged for assigning each cell of said M cells at least one sub frame of said radio frame for transmission of data destined for user equipment in said each cell;
   a receiver antenna system multiplexer connected to at least $N_{RX}$ receivers among said $M_{RX}$ receivers, wherein $1 \leq N_{RX} < M_{RX}$, wherein $M_{RX} - N_{RX}$ remaining receivers of said $M_{RX}$ receivers are turned off or inoperable during said radio frame, and wherein the M antenna interfaces assigned for said M cells are arranged for selectively connecting a receiver of said $N_{RX}$ receivers to an antenna interface of said M antenna interfaces; and
   a receiver controller arranged for controlling said receiver antenna system multiplexer to selectively interconnect said $N_{RX}$ receivers and said M antenna interfaces to connect at least one receiver of said $N_{RX}$ receivers to a first antenna interface of said at least M antenna interfaces during at least one sub frame of said radio frame and to a second antenna interface of said at least M antenna interfaces during at least another sub frame of said radio frame, and to connect, for each cell of said M cells, said antenna interface assigned to said each cell to a receiver of said $N_{RX}$ receivers during at least one sub frame that is assigned for reception of data from user equipment in said each cell and that is present at a predefined sub frame distance from said at least one sub frame assigned to said each cell by said transmitter controller.

2. The data communication scheduling system of claim 1, wherein said transmitter controller is arranged for scheduling said data transmission by said radio base station for said M cells during said radio frame using said $N_{TX}$ transmitters to assign each cell of said M cells at least a first sub frame and a second sub frame present in said radio frame at five sub frames following said first sub frame for transmission of said data destined for said user equipment in said each cell.

3. The data communication scheduling system of claim 1, wherein said transmitter controller is arranged for scheduling said data transmission by said radio base station for said M cells during said radio frame using two transmitters to assign each cell of said M cells at least two consecutive sub frames of said radio frame for transmission of said data destined for said user equipment in said each cell.

4. The data communication scheduling system of claim 3, wherein said receiver controller is arranged for controlling said receiver antenna system multiplexer to selectively interconnect said $N_{RX}$ receivers and said M antenna interfaces to connect, for each cell of said M cells, said antenna interface assigned to said each cell to a receiver of two receivers during at least two consecutive sub frames that are assigned for reception of said data from said user equipment in said each cell and that are present at said predefined sub frame distance from said at least two sub frames assigned to said each cell by said transmitter controller.

5. The data communication scheduling system of claim 1, wherein said receiver controller is arranged for controlling said receiver antenna system multiplexer to selectively interconnect said $N_{RX}$ receivers and said M antenna interfaces to connect, for each cell of said M cells, said antenna interface assigned to said each cell to a receiver of said $N_{RX}$ receivers during at least one sub frame that is assigned for reception of said data from said user equipment in said each cell and that is present in said radio frame four sub frames following said at least one sub frame assigned to said each cell by said transmitter controller.

6. The data communication scheduling system of claim 1, further comprising:
   a transmitter status controller arranged for turning off said $M_{TX} - N_{TX}$ remaining transmitters of said $M_{TX}$ transmitters; and
   a receiver status controller arranged for turning off said $M_{RX} - N_{RX}$ remaining receivers of said $M_{RX}$ receivers.

7. The data communication scheduling system of claim 6, wherein said transmitter status controller and said receiver status controller are arranged for turning off said $M_{TX} - N_{TX}$ remaining transmitters and said $M_{RX} - N_{RX}$ remaining receivers at a predefined time interval of a day.

8. The data communication scheduling system of claim 6, further comprising a load estimator arranged for generating a control signal if an estimated, expected data traffic load in said M cells during a time interval is below a traffic threshold, wherein said transmitter status controller and said receiver status controller turn off said $M_{TX} - N_{TX}$ remaining transmitters and said $M_{RX} - N_{RX}$ remaining receivers based on said control signal.

9. The data communication scheduling system of claim 1, wherein said $N_{TX}$ transmitters are arranged for broadcasting data destined for said user equipment in said M cells using an omnidirectional antenna arrangement connectable to an antenna interface of said at least M antenna interfaces at said sub frames of said multiple sub frames assigned for transmission of said data by said transmitter controller.

10. The data communication scheduling system of claim 1, further comprising a transmitter antenna system multiplexer connected to at least said $N_{TX}$ transmitters and said M antenna interfaces and arranged for selectively connecting a transmitter of said $N_{TX}$ transmitters to an antenna interface of said M antenna interfaces, wherein said transmitter controller is arranged for controlling said transmitter antenna system multiplexer to selectively interconnect said $N_{TX}$ transmitters and said M antenna interfaces to connect, for each cell of said M cells, said antenna interface assigned to said each cell to a transmitter of said $N_{TX}$ transmitters during said at least one sub frame assigned for transmission of said data destined for said user equipment in said each cell.

11. The data communication scheduling system of claim 10, wherein said transmitter antenna system multiplexer comprises:
   $M_{TX}$ radio frequency multiplexers each connected to a respective transmitter of said $M_{TX}$ transmitters;
   M radio frequency filters each connected to a respective antenna interface of said M antenna interfaces; and
   a combiner network interconnecting each radio frequency filter of said M radio frequency filters with each radio frequency multiplexer of said $M_{TX}$ radio frequency multiplexers.

12. The data communication scheduling system of claim 10, wherein said transmitter antenna system multiplexer comprises:
   M first radio frequency multiplexers connected to a respective antenna interface of said M antenna interfaces;
   $N_{TX}$ second radio frequency multiplexers connected to a respective transmitter of said $N_{TX}$ transmitters and a respective first radio frequency multiplexer of said M first radio frequency multiplexers; and
   $N_{TX}$ radio frequency splitters connected to a respective second radio frequency multiplexer of said $N_{TX}$ second radio frequency multiplexers and said M first radio frequency multiplexers.

13. The data communication scheduling system of claim 1, wherein said receiver antenna system multiplexer comprises:
   M radio frequency amplifiers connected to a respective antenna interface of said M antenna interfaces;
   M radio frequency splitters connected to a respective radio frequency amplifier of said M radio frequency amplifiers and arranged for splitting an amplified radio frequency signal into $M_{RX}$ signal copies; and
   $M_{RX}$ radio frequency multiplexers connected to a respective receiver of said $M_{RX}$ receivers and said M radio frequency splitters.

14. The data communication scheduling system of claim 1, wherein each of said at least M antenna arrangements of the radio base station is connected to a respective antenna interface of said data communication scheduling system.

15. A method for scheduling data communication by a radio base station serving at least M≥2 cells and comprising at least M antenna arrangements, $M_{TX}$ transmitters, wherein $M_{TX} \geq M$, and $M_{RX}$ receivers, wherein $M_{RX} \geq M$, wherein each cell of said M cells are assigned at least one transmitter of said $M_{TX}$ transmitters, at least one receiver of said $M_{RX}$ receivers and an antenna arrangement of said at least M antenna arrangements, and wherein each transmitter of said $M_{TX}$ transmitters is connectable to at least one antenna arrangement of said at least M antenna arrangements and each receiver of said $M_{RK}$ receivers is connectable to at least one antenna arrangement of said at least M antenna arrangements, said method comprising:
   scheduling data transmission by said radio base station for said M cells during a radio frame comprising multiple sub frames using $N_{TX}$ transmitters of said $M_{TX}$ transmitters, wherein $1 \leq N_{TX} < M_{TX}$, and wherein $M_{TX} - N_{TX}$ remaining transmitters of said $M_{TX}$ transmitters are turned off or inoperable during said radio frame by scheduling at least one transmitter of said $N_{TX}$ transmitters to transmit data destined for user equipment in a first cell of said M cells during at least one sub frame of said radio frame and to transmit data destined for user equipment in a second cell of said M cells during at least another sub frame of said radio frame, and by assigning each cell of said M cells at least one sub frame of said radio frame for transmission of data destined for user equipment in said each cell; and
   selectively connecting a receiver of $N_{RX}$ receivers among said $M_{RX}$ receivers, wherein $1 \leq N_{RX} < M_{RX}$, and wherein $M_{RX} - N_{RX}$ remaining receivers of said $M_{RX}$ receivers are turned off or inoperable during said radio frame, to an antenna arrangement of said M antenna arrangements by connecting at least one receiver of said $N_{RX}$ receivers to a first antenna arrangement of said M antenna arrangements during at least one sub frame of said radio frame and to a second antenna arrangement of said M antenna arrangements during at least another sub frame of said radio frame and by connecting, for each cell of said M cells, said antenna arrangement assigned to said each cell to a receiver of said $N_{RX}$ receivers during at least one sub frame that is assigned for reception of data from user equipment in said each cell and that is present at a predefined sub frame distance from said at least one sub frame assigned to said each cell for transmission of data.

16. The method of claim 15, wherein said step of scheduling data transmission comprises scheduling said data transmission by said radio base station for said M cells during said radio frame using said $N_{TX}$ transmitters by assigning each cell of said M cells at least a first sub frame and a second sub frame present in said radio frame at five sub frames following said first sub frame for transmission of said data destined for said user equipment in said each cell.

17. The method of claim 15, wherein said step of scheduling data transmission comprises scheduling said data transmission by said radio base station for said M cells during said radio frame using two transmitters by assigning each cell of said M cells at least two consecutive sub frames of said radio frame for transmission of said data destined for said user equipment in said each cell.

18. The method of claim 17, wherein said step of selectively connecting a receiver comprises selectively connecting said receiver of said $N_{RX}$ receivers to said antenna arrangement of said M antenna arrangements by connecting, for each cell of said M cells, said antenna arrangement assigned to said each cell to a receiver of two receivers during at least two consecutive sub frames that are assigned for reception of said data from said user equipment in said each cell and that are present at said predefined sub frame distance from said at least two sub frames assigned to said each cell for transmission of data.

19. The method of claim 15, wherein said step of selectively connecting a receiver comprises selectively connecting said receiver of said $N_{RX}$ receivers to said antenna arrangement of said M antenna arrangements by connecting, for each cell of said M cells, said antenna arrangement assigned to said each cell to a receiver of said $N_{RX}$ receivers during at least one sub frame that is assigned for reception of said data from said user equipment in said each cell and that is present in said radio frame four sub frames following said at least one sub frame assigned to said each cell for transmission of data.

20. The method of claim 15, further comprising the steps of:
   turning off said $M_{TX} - N_{TX}$ remaining transmitters of said $M_{TX}$ transmitters; and
   turning off said $M_{RX} - N_{RX}$ remaining receivers of said $M_{RX}$ receivers.

21. The method of claim 20, wherein said steps of turning off said $M_{TX}$–$N_{TX}$ remaining transmitters and said $M_{RX}$–$N_{RX}$ remaining receivers are performed at a predefined time interval of a day.

22. The method of claim 20, further comprising the step of estimating an expected data traffic load in said M cells during a time interval, wherein said steps of turning off said $M_{TX}$–$N_{TX}$ remaining transmitters and said $M_{RX}$–$N_{RX}$ remaining receivers are triggered if said expected data traffic load is below a traffic threshold.

23. The method of claim 15, further comprising the step of said $N_{TX}$ transmitters broadcasting data destined for said user equipment in said M cells using an omnidirectional antenna arrangement connected to said $N_{TX}$ transmitters at said sub frames of said radio frame assigned for transmission of said data.

24. The method of claim 15, wherein said step of scheduling data transmission comprises selectively connecting a transmitter of said $N_{TX}$ transmitters to an antenna arrangement of said M antenna arrangements by connecting, for each cell of said M cells, said antenna arrangement assigned to said each cell to a transmitter of said $N_{TX}$ transmitters during said at least one sub frame assigned for transmission of said data destined for said user equipment in said each cell.

\* \* \* \* \*

UNITED STATES PATENT AND TRADEMARK OFFICE
CERTIFICATE OF CORRECTION

| | |
|---|---|
| PATENT NO. | : 8,626,088 B2 |
| APPLICATION NO. | : 13/263207 |
| DATED | : January 7, 2014 |
| INVENTOR(S) | : Osterling et al. |

It is certified that error appears in the above-identified patent and that said Letters Patent is hereby corrected as shown below:

On the Title Page, in Item [75], delete "Fredrol Lindgren," and insert -- Fredrik Lindgren, --, therefor.

In the Claims

Column 24, Line 52, Claim 8, delete "MRX'NRX" and insert -- MRX-NRX --, therefor.

Signed and Sealed this
Sixteenth Day of September, 2014

Michelle K. Lee
*Deputy Director of the United States Patent and Trademark Office*